United States Patent
Yamagishi

(10) Patent No.: US 6,393,252 B1
(45) Date of Patent: May 21, 2002

(54) DUPLEX IMAGE RECORDING METHOD AND APPARATUS WITH INTERLEAF CONTROL

(75) Inventor: Masaru Yamagishi, Kanagawa (JP)

(73) Assignee: Ricoh Company , Ltd., Tokyo (JP)

( * ) Notice: Subject to any disclaimer, the term of this patent is extended or adjusted under 35 U.S.C. 154(b) by 0 days.

(21) Appl. No.: 09/695,288

(22) Filed: Oct. 25, 2000

(30) Foreign Application Priority Data

| Jan. 2, 1959 | (JP) | ............................................ 11-303056 |
| Mar. 10, 2000 | (JP) | ...................................... 2000-067559 |
| Oct. 10, 2000 | (JP) | ...................................... 2000-309717 |

(51) Int. Cl.$^7$ ............................................ G03G 15/00
(52) U.S. Cl. ...................................................... 399/401
(58) Field of Search ................................ 399/361, 363, 399/364, 381, 382, 397, 401, 402; 355/24; 271/278, 288

(56) References Cited

U.S. PATENT DOCUMENTS 4,935,786 A * 6/1990 Veeder ......................... 399/401
5,132,720 A * 7/1992 Kioka et al. .................... 355/24
5,737,682 A 4/1998 Yamagishi .................... 399/402

FOREIGN PATENT DOCUMENTS

| JP | 7-160067 | 6/1995 |
| JP | 8-234634 | 9/1996 |

* cited by examiner

*Primary Examiner*—Sophia S. Chen
*Assistant Examiner*—Hoan Tran
(74) *Attorney, Agent, or Firm*—Oblon, Spivak, McClelland, Maier & Neustadt, P.C.

(57) ABSTRACT

A duplex recording method for an image forming apparatus stores page-by-page image data in a storage in the order of page and records, among the image data, two consecutive pages of image data on the front and rear of a recording medium, respectively. At this instant, the method records the image data on the rear of the recording medium carrying an image on the front and a new recording medium alternately by using an interleaf control system. Assume that images are continuously recorded on the fronts of n consecutive recording media at the initial stage of printing. Then, the method continuously records images on the fronts of n+1 consecutive recording media at the final stage of printing. An apparatus for practicing the method is also disclosed.

29 Claims, 14 Drawing Sheets

DUPLEX IMAGE RECORDING METHOD AND APPARATUS WITH INTERLEAF CONTROL

BACKGROUND OF THE INVENTION

The present invention relates to a copier, printer facsimile apparatus or similar image forming apparatus and more particularly to a duplex image recording apparatus capable of forming images on both sides of a recording medium by a so-called interleaf control system.

In parallel with the spread of digital copiers, printers, facsimile apparatuses and other image forming apparatuses, there is an increasing demand for high productivity in relation to duplex copies. A current trend with a digital duplex image recording apparatus is toward an interleaf control system capable of promoting efficient printing. Japanese Patent Laid-Open Publication No. 63-313172, for example, teaches an interleaf control system that prints an image on the first side of the first paper sheet or similar recording medium, prints an image on the first side of the second or new paper sheet before returning the first paper sheet to a recording position, records an image on the second side of the first paper sheet, and repeats such alternate image formation thereafter.

It is a common practice with, e.g., a digital copier to read documents that are sequentially fed by an ADF (Automatic Document Feeder) mounted on the copier. The resulting image data are sequentially printed out in the order in which they are read or are written to, e.g., a memory so as to be printed out later, as needed.

The flow of paper sheets to occur in a duplex copy mode available with a conventional digital copier will be briefly described hereinafter. To produce a duplex copy, the copier prints an image on the first side or front of a paper sheet, reverses or turns back the paper sheet carrying the image on one side thereof, and returns the paper sheet to a recording position so as to form an image on the rear or second side of the paper sheet. Today, a stackless type of duplex recording system, which does not stack paper sheets in a duplex copy unit, is becoming predominant over the other duplex recording systems. The simplest duplex copying method is forming an image on the front of a paper sheet and then forms an image on the rear of the same paper sheet when the paper sheet is returned to a recording position. This method, however, lacks in efficiency and lowers productivity as the length of a duplex conveying path increases.

Specifically, assume that images are sequentially formed on the front of the first paper sheet, the rear of the first paper sheet, the front of the second paper sheet, the rear of the second paper sheet and so on. Then, an image is formed on the rear of each paper sheet only after the paper sheet carrying an image on its front has been passed through the entire duplex conveying path, resulting in the waste of time.

The interleaf control system has been proposed to enhance productivity. Specifically, the interleaf control system first prints images on the fronts of two or more consecutive paper sheets while sequentially conveying them to an intermediate path. The system again feeds the first paper sheet carrying the image thereon to a recording unit in order to print an image on the other side or rear thereof. Just after an image has been printed on the rear of the above paper sheet, the system feeds a new paper sheet from a paper feeding section to the recording unit so as to print an image on the front thereof. Thereafter, the system repeats the feed of a new paper sheet (front) from the paper feeding section and the refeed of the paper sheet carrying an image on one side thereof form the duplex copy unit alternately. In this manner, a new paper sheet is fed between two one-sided paper sheets, so that a paper sheet always exists on a conveyance path. This is successful to enhance productivity.

For example, in a two-interleaf control system, images are sequentially printed on the front of the first paper sheet, the front of the second paper sheet, the rear of the first paper sheet, the front of the third paper sheet, the rear of the second paper sheet, the front of the fourth paper sheet and so on. In a three-interleaf control system, images are sequentially printed on the front of the first paper sheet, the front of the second paper sheet, the front of the third paper sheet, the rear of the first paper sheet, the front of the fourth paper sheet, the rear of the second paper sheet and so on.

However, an image recording apparatuses using the conventional interleaf control system has some problems left unsolved, as will be described in detail later.

Technologies relating to the present invention are also disclosed in, e.g., Japanese Patent Laid-Open Publication Nos. 7-160067 and 8-234631.

SUMMARY OF THE INVENTION

It is therefore an object of the present invention to provide a duplex image recording method capable of reducing a loss ascribable to interleaf control when dealing with the last paper sheet and thereby enhancing productivity in a duplex record mode, and an apparatus for practicing the same.

It is another object of the present invention to provide a duplex image recording method capable of effecting optimal processing (reduction of a loss at the final stage of printing) with each of a copier, a printer and so forth different in an image data reading method from each other even when only a single copy of printings is desired and thereby improving productivity, and an apparatus for practicing the same.

It is a further object of the present invention to provide a duplex image recording method capable of obviating, when a plurality of copies of duplex printings are produced from a plurality of simplex or one-sided documents by the conventional interleaf control system, not only the loss in the final stage but also a loss at the initial stage to thereby realize 100% duplex productivity (simplex image recording time= duplex image recording time), and an apparatus for practicing the same.

In accordance with the present invention, in a method of recording, among image data stored in an order of page, two consecutive pages of image data on the first and second sides of a recording medium, respectively, by interleaf control that records image data alternately on the second side of the recording medium carrying an image on the first side and a new recording medium. Assuming that the image data are continuously recorded on the first sides of n consecutive recording media at the beginning, the interleaf control continuously prints the image data on the first sides of n +1 consecutive recording media at the final stage of printing.

Also, in accordance with the present invention, a duplex image recording apparatus records images on the first and second sides of a recording medium by interleaf control that records images alternately on the second side of the recording medium carrying an image on the first side and a new recording medium. The apparatus includes a storage for storing image data in the order of page. A recording device records, among the image data stored in the storage, two consecutive pages of image data on the first and second sides of a recording medium, respectively. A reversing device reverses, after the image data has been recorded on the first side of the recording medium, the recording medium. A conveying device conveys the recording medium reversed by the reversing device toward the recording device to thereby allow the image data to be recorded on the second side of the recording medium. A controller controls the storage, recording device, reversing device, and conveying device. Assuming that the image data are continuously printed on first sides of n consecutive recording media at the beginning, the controller causes the image data to be printed on the first sides of n+1 consecutive recording media at the final stage of printing.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
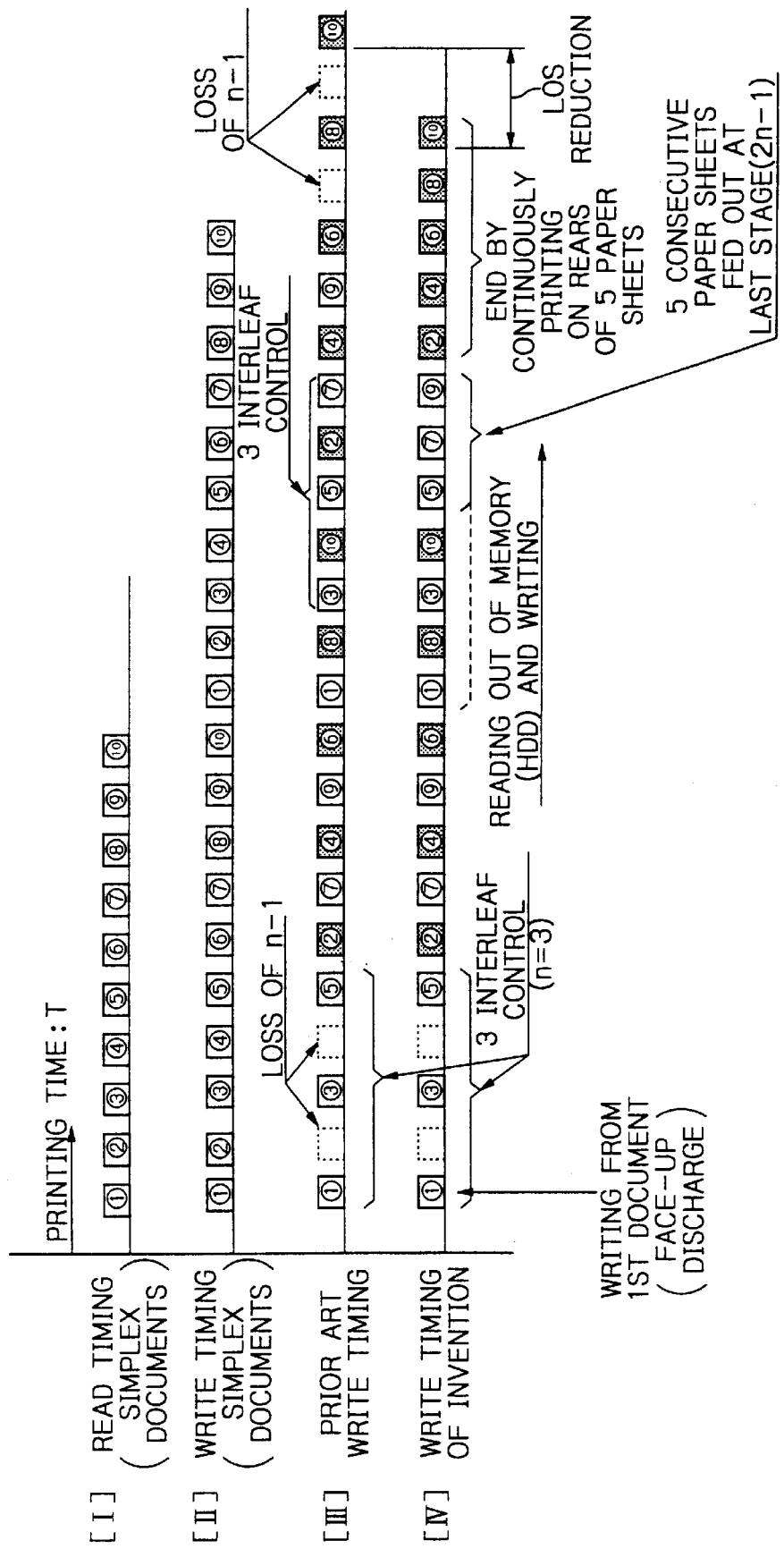
FIG. 1 is a timing chart demonstrating a conventional interleaf control system and an interleaf control system unique to the present invention.

To better understand the present invention, brief reference will be made to the conventional interleaf control system, shown in FIG. 1. In FIG. 1, [I] shows a timing for a duplex image recording system using the interleaf control system and an ADF to read image data. As shown, the recording system sequentially reads ten simplex or one-sided documents, i.e., the first page to the tenth page. Specifically, the ADF sequentially reads image data out of the documents at a preselected timing. The recording system is assumed to write image data in a photoconductive element in synchronism with the reading timing of the ADF. Therefore, in a simplex record mode shown in FIG. 1, [II], image data is written to the photoconductive element at substantially the same speed as a document is read. It is to be noted that some lag exists between the timing for reading each page and the timing for writing the image of the page in the photoconductive element because the image is written to a memory and then read thereoutof. Some lag also exists between the timing for writing image data in the photoconductive element in order to form a latent image and the timing for transferring the resulting toner image to a paper sheet or similar recording medium. This lag is, however, usually constant.

FIG. 1, [III], shows a specific conventional interleaf control system in which the number of interleaves n is "3". The number of interleaves n refers to the number of paper sheets to be formed with images on the fronts or first sides thereof and existing in a conveyance path. Therefore, the number of interleaves n which is "3" refers to a condition wherein three paper sheets whose fronts sequentially face the photoconductive element exist in the conveyance path so as to be formed with images. The specific system shown in FIG. 1, [III], is assumed to produce two sets of printings from ten simplex documents in a sort mode. Because the system assumes face-up discharge (printings are sequentially stacked with odd pages 1, 3, 5 and so forth facing downward), page 1 and successive odd pages are sequentially read while the resulting image data are sequentially written in the photoconductive element as substantially the same timing. Further, the image data read by an ADF are written to a memory or an HDD (Hard Disk Drive) in order to produce a plurality of sets of printings. In FIG. 1, numerals with circles (①, ②, ③ and so on) correspond to page numbers while mesh frames and bold frames indicate the rears of paper sheets and second sets of printings, respectively. Further, the abscissa in FIG. 1 indicates time.

First, images are sequentially printed on the fronts of the first to third paper sheets (pages ①, ③ and ⑤) in synchronism with the odd pages sequentially read. The first paper sheet is then turned back and again fed to a recording position or image transfer position via a duplex path or duplex loop, so that an image is printed on the rear (page ②) of the paper sheet. The fourth paper sheet, which is new, is fed to follow the first paper sheet being discharged as a duplex printing, so that an image is formed on the front of the fourth paper sheet (page ⑦). Subsequently, the second one-sided paper sheet (page ③) is refed from the duplex loop to follow the fourth paper sheet so as to print an image on the rear thereof (page ④). Such an alternative paper feed or conveyance procedure is repeated thereafter.

A problem with the above-described procedure is that images to be printed on the even pages or rears cannot be written in the photoconductive element in the initial stage of document reading. As a result, a loss corresponding to n−1 paper sheets occurs while the image data are being read out of the odd pages of the documents. In the specific case shown in FIG. 1, [III], a loss corresponding to two paper sheets occurs at the positions represented by phantom frames because n is "3". After the alternate paper feed has begun, the image data are read out of the memory or the HDD and written in the photoconductive element.

Moreover, in the final stage of the procedure shown in FIG. 1, [III], no newpapers are fed by the interleaf control after an image has been printed on the page ⑥ of the second set of printings. Consequently, a loss corresponding to n−1 (two) paper sheets occurs, as illustrated. This is the drawback with the interleaf control and lowers productivity. In this manner, not only the loss of n−1 (two) occurs in the initial stage, but also the loss of n−1 (two) occurs in the final stage.

The loss at the initial stage is ascribable to the following two different causes:

(1) Image reading speed available with, e.g., an ADF (whether or not image data ready to be written in response to an image record request is present); and (2) Length of a duplex conveyance path necessary for duplex image recording.

As for the above cause (1), an ADF, for example, continuously reads consecutive documents as pages ①, ②, ③, ④ and so on, so that image data representative of the pages ② and ④ (even page data) should be printed on the rears of paper sheets and cannot be immediately written in the photoconductive element. The image data representative of the even pages are therefore written to a memory or similar storage. In the initial stage, image data representative of the odd pages ①, ③ and ⑤ and so forth are sequentially written. Thereafter, odd pages are written and recorded at intervals. As a result, when the ADF reads a number of one-sided documents, a loss is not avoidable when the pages ② and ④ are read, as shown in FIG. 1, [II].

As for the cause (2), even if images are continuously printed on three paper sheets ①, ③ and ⑤, a loss of n−1 again occurs before the first paper sheet ① returns to the recording position by way of the duplex conveyance path. Obviously, therefore, the length of the duplex conveyance path is causative of the loss.

Preferred embodiments of the present invention will be described hereinafter.

First Embodiment

Figure 2:
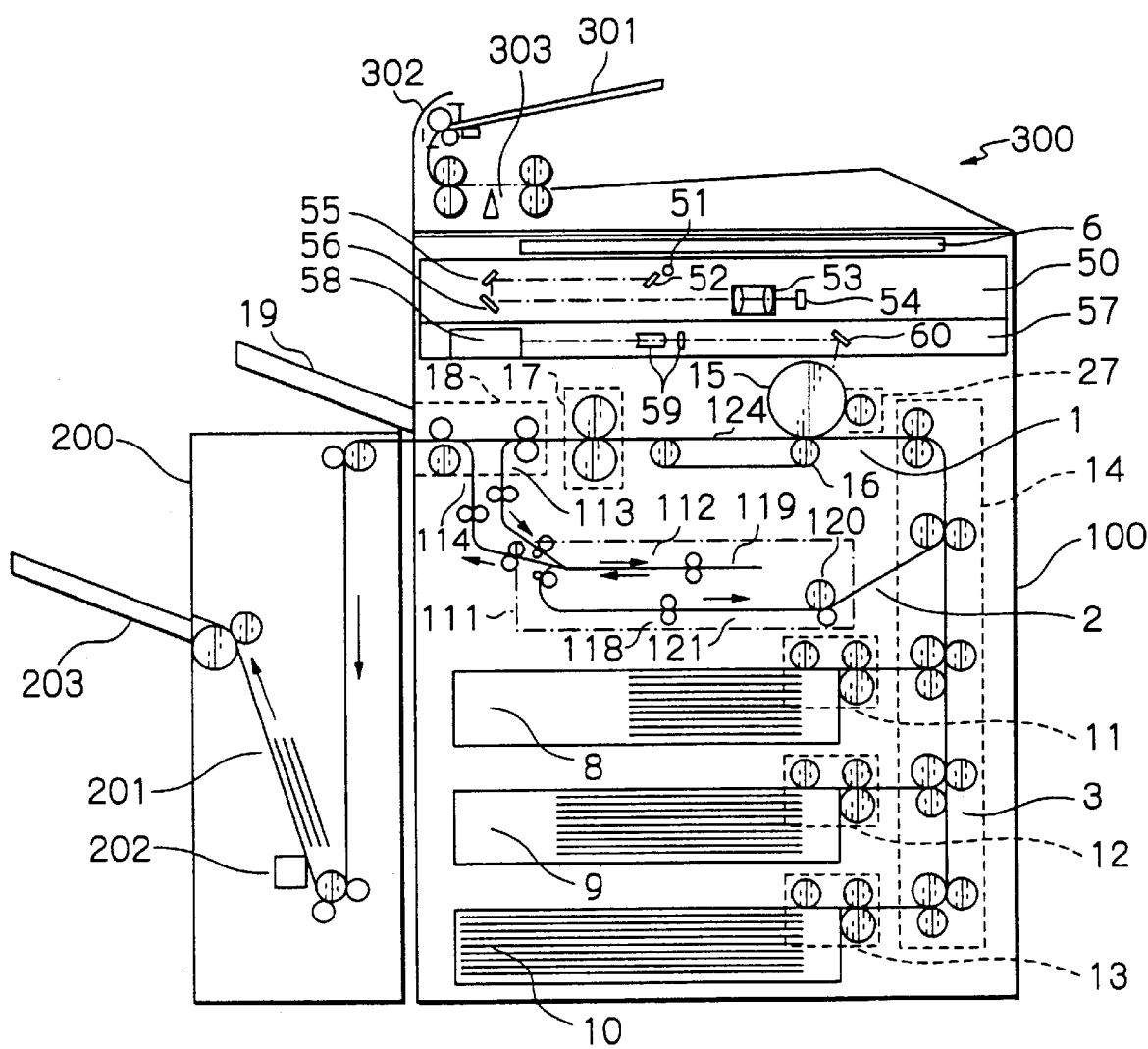
FIG. 2 is a view showing a duplex image recording apparatus embodying the present invention and implemented as a digital copier by way of example.

Referring to FIG. 2, an image forming apparatus embodying the present invention is shown and implemented as a digital copier by way of example. The digital copier is generally made up of a copier body 100, a finisher 200, and an ADF 300. The copier body 100 includes an image forming section 1, a conveying section 2, a paper feeding section 3, a reading unit 50, and a writing unit 57.

The reading unit 50 scans a document laid on a glass platen 6 with scanning optics. The scanning optics includes a lamp 51, a first mirror 52, a second mirror 55, a third mirror 56, a lens 53, and a CCD (Charge Coupled Device) image sensor 54. The lamp 51 and first mirror 52 are mounted on a first carriage, not shown, while the second mirror 55 and third mirror 56 are mounted on a second carriage not shown. To prevent the length of an optical path from changing, the first and second carriages are mechanically moved at a relative speed of 2:1 while reading a document image. A scanner motor, not shown, drives the scanning optics. The CCD image sensor 54 reads the document image and transforms it to a corresponding electric signal.

The ADF 300 automatically reads sheet documents. Specifically, the ADF 300 includes a document tray 301 on which documents are stacked. A pickup roller 302 pays out the documents from the document tray 301 toward a document sensor 303 one by one. The document sensor 303 reads the front side of each document being conveyed therethrough at a constant speed. The resulting image data is subjected to MTF (Modulation Transfer Function) correction, filtering, compression and so forth and then written to an image memory. In the illustrative embodiment, the image sensor 303 is implemented by a contact type, ×1 CCD device and capable of reading one side or both sides of the document in a sheet-through fashion.

The writing unit 57 includes a laser unit 58, a lens 59, and a mirror 60. The laser unit 58 accommodates a laser diode and a polygonal mirror although not shown specifically. The polygonal mirror is caused to rotate at a constant speed by a motor not shown. A laser beam issuing from the laser diode scans the surface of a photoconductive element 15 included in the image forming section 1. In the illustrative embodiment, the photoconductive element 15 is implemented as a drum.

A procedure for printing an image formed on the drum 15 will be briefly described hereinafter. The paper feeding section 3 includes a first to a third tray 8, 9 and 10 each being loaded with a stack of paper sheets. A first to a third paper feeding device 11, 12 and 13 feed the paper sheets from the trays 8, 9 and 10, respectively. A vertical conveying unit 14 conveys the paper sheet fed from any one of the trays 8 through 10 to a position where the paper sheet contacts the drum 15. The laser beam issuing from the writing unit 57 scans the drum 15 in order to form a latent image represented by the image data stored in the memory on the drum 15. A developing unit 27 develops the latent image to thereby form a corresponding toner image. While a belt 127 conveys the paper sheet at a speed equal to the rotation speed of the drum 15, an image transfer unit 16 transfers the toner image from the drum 15 to the paper sheet. A fixing unit 17 fixes the toner image on the paper sheet. The paper sheet is then driven out to a tray 19 by a paper discharging unit 18.

Figure 3:
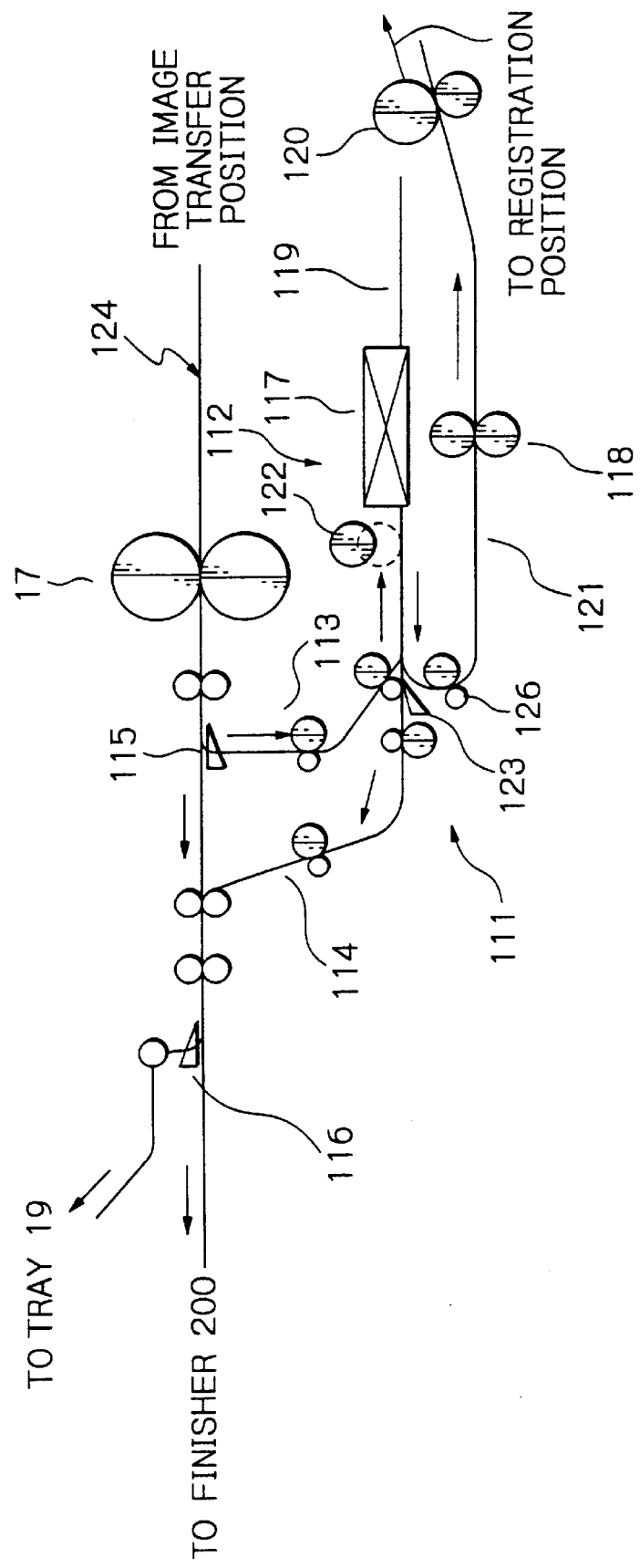
FIG. 3 is a view showing the operation of a reversing unit included in the illustrative embodiment.

Reference will be made to FIG. 3 for describing the operation of a reversing unit 112 also arranged in the copier body 100. As shown, in a duplex copy mode for forming images on both sides of the paper sheet, a path selector 115 is so positioned as to steer the paper sheet carrying an image on one side thereof into a duplex inlet path 113. As a result, the paper sheet is conveyed along the duplex inlet path 113 to the reversing unit 112 included in a duplex conveying unit 111. The paper sheet is once brought to a stop in a switch back path 119 contiguous with the duplex inlet path 113. A jogger fence 117 positions the paper sheet on the switchback path 119 in the widthwise direction thereof. Subsequently, a return conveying unit 122 pays out the paper sheet from the switchback path 119 in the opposite direction (refeed direction hereinafter). A path selector 123 steers the paper sheet paid out by the return conveying unit 122 downward into an intermediate path 121 positioned below the switchback path 119. As a result, the paper sheet is turned back. A motor or drive source, not shown, causes an intermediate conveying unit 118 and a duplex outlet conveying unit 120 to again feed the paper sheet to the vertical conveying unit 14. Consequently, an image is formed on the other side or rear of the paper sheet.

The conveying units 118 and 120 each include a solenoid operated clutch or similar drive interrupting means, so that one or more paper sheets can stay on the intermediate path 121 closely to each other. When the one-sided paper sheet should be simply discharged after being reversed, the path selector 123 steers the paper sheet switched back by the reversing unit 112 toward a reversal outlet path 114.

The return conveying unit 122 positioned on the switchback path 119 is movable upward away from the path 119. This allows two paper sheets to exist on the switchback path 119 together in such a manner as to pass each other. Specifically, after a reversal outlet roller 126 has fully gripped the preceding paper sheet, a reversal inlet roller 125 drives the following paper sheet into the switchback path 119 with the jogger fence 117 being retracted.

A path selector 116 steers the paper sheet driven out of the copier body 100 toward the tray 19 or the finisher 200, depending on the mode selected. Specifically, in a staple mode, the paper sheet is conveyed to the finisher 200 and stacked on a stack tray 201. After a preselected number of paper sheets have been stacked on the stack tray 201, the paper stack is stapled by a stapler unit 202 and then driven out to a tray 203.

In the illustrative embodiment, a duplex conveyance path refers to a loop including a body path 124 and the duplex inlet path 113, switchback path 119 and intermediate path 121. The drum 15, developing unit 27, image transferring unit 16 and fixing unit 17 constitute image recording-means.

Figure 4:
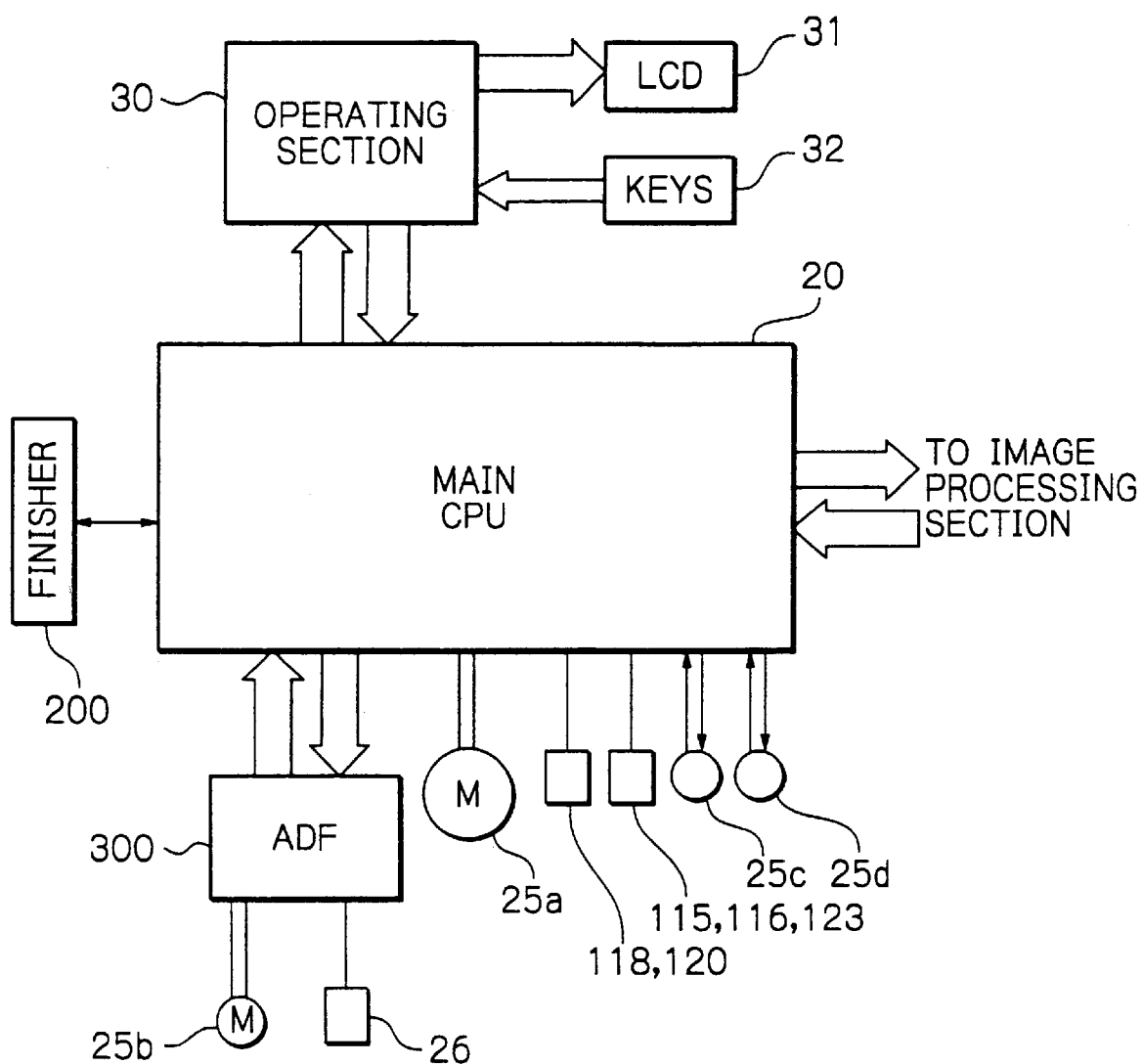
FIG. 4 is a block diagram schematically showing major part of a control unit also included in the illustrative embodiment.

FIG. 4 shows major part of a control unit included in the illustrative embodiment. As shown, the control unit is generally made up of a main CPU (Central Processing Unit) 20 and an operating section 30. Keys 32 and an LCD (Liquid Crystal Display) 31 are connected to the operating section 30. The finisher 200 and ADF 300 are connected to the main CPU 20. The main CPU 20 receives information from the keys 32 via the operating section 30, displays information on the LCD 31, and controls the ADF 300. Further, the main CPU 20 controls various loads including a main motor 25a, a conveyance motor 25b, the path selectors or solenoids 115, 116 and 123, clutches 118 and 120, a duplex conveyance motor 25c and a jogger motor 25d and controls communication with the finisher 200. The main CPU 20 is connected to a memory controller 65 (see FIG. 5) included in image processing circuitry by a bus.

Figure 5:
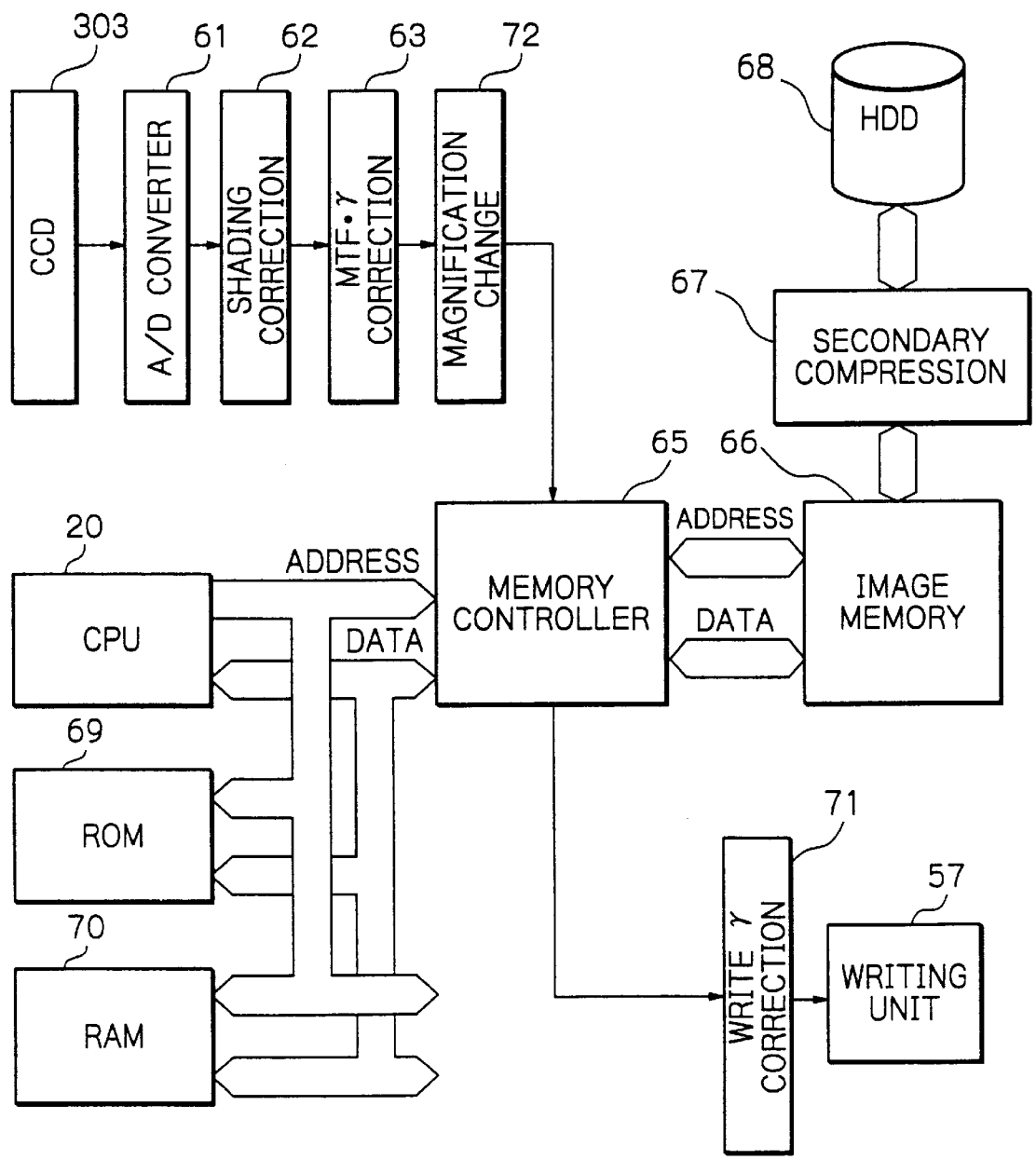
FIG. 5 is a schematic block diagram showing an image processing section further included in the illustrative embodiment.

As shown in FIG. 5, the memory controller 65 constitutes a memory section together with an image memory 66, a secondary compression 67, and an HDD 68. A COD (Charge Coupled Device) image sensor 303 included in the ADF 300 for reading a document, an analog-to-digital (A/D) converter 61, a shading correction 62, an MTF/γ correction 63 and a magnification change 72 constitute an image data processing section. A write γ correction 71 and the previously stated writing unit 57 constitute a writing section. A ROM (Read Only Memory) 69 and a RAM (Random Access Memory) 70 are connected to the CPU 20. The ROM 69 stores static data including a program to be executed by the CPU 20 while the RAM 70 serves as a work area for the CPU 20 and stores dynamic data including data to be used by the CPU 20.

In operation, the CCD image sensor 303 reads a document image and outputs an analog image signal representative of the document image. The A/D converter 61 converts the analog image signal to a digital image signal. The shading correction 62 executes shading correction with the digital image signal and inputs the corrected image signal to the MTF/γ correction 63. The image signal subjected to MTF/γ correction by the MTF/γ correction 63 is enlarged or reduced in accordance with a desired magnification by the magnification change 72 and then input to the memory controller 65. The memory controller 65 executes primary compression with the input image signal and then writes the compressed image signal in the image memory 66. The procedure described so far is continued until data representative of the entire page have been written to the image memory 66.

The image data written to the image memory 66 are further compressed by the secondary compression 67 so as to be further reduced in amount, if necessary. The resulting compressed data are written to the HDD 68 or similar storage, so that a plurality of copies can be output by a single reading operation. However, when the image data are read out of the HDD 68 for a printing purpose, they must be rearranged in the image memory 66, consuming an extra period of time. Further, the operation for writing the compressed image data in the HDD 68 and the operation for reading them out cannot be effected at the same time and must be shifted from each other with respect to time.

At the time of printing, the image data stored in the image memory 66 are transferred from the image memory 66 to the writing unit 57 via the memory controller 65 and write γ correction 71. Also, while the documents are sequentially read, the resulting image data are sequentially written to the HDD 68 for a sorting purpose. At this instant, it is important to note that the HDD 68 is accessed only to write the image data during the production of the first set of copies, i.e., when image data are printed out in parallel with the reading of the documents; that is, the image data are not transferred from the HDD 68 to the image memory 68. This is because the HDD 68 can be accessed in only one direction. Should batting of the data writing in the HDD 68 and the data reading from the HDD 68 be not avoided as far as possible, productivity would not be enhanced. For this reason, the image memory 66 is not opened until the data transfer to the HDD 68 ends, preventing other image data from being written to the image memory 66.

How the illustrative embodiment produces duplex copies, or printings, will be described hereinafter. In the duplex copy mode, a paper sheet carrying an image on one side or front thereof is passed through the duplex conveying unit 111 and then returned to the image transfer position upside down. Interleaf duplex printing, which is effected to enhance productivity, will be described first.

The simplest, duplex copying method is forming an image on the front of a paper sheet and then forming an image on the rear of the same paper sheet when the paper sheet is returned to a registration position. This method, however, lacks in efficiency and lowers productivity as the length of the duplex conveyance path increases. Specifically, assume that images are sequentially formed on the front of the first paper sheet, the rear of the first paper sheet, the front of the second paper sheet, the rear of the second paper sheet, the front of the third paper sheet, the rear of the third paper sheet and so on. Then, an image is formed on the rear of each paper sheet only after the paper sheet carrying an image on its front has been passed through the entire duplex conveying path, resulting in the waste of time.

The interleaf control system is a solution to the above-described problem. Specifically, the system sequentially prints images on the fronts of two or more paper sheets and then prints an image on the rear of the first paper sheet as soon as it is returned to a registration position. The system then feeds a single new paper sheet to follow the first paper sheet, or duplex copy being discharged, in order to print an image on the front thereof. Thereafter, images are alternatively printed on the fronts and rears of the successive paper sheets. In this manner, a new paper sheet is fed between two one-sided paper sheets, so that a paper sheet always exists on the conveyance path. This is successful to enhance productivity. For example, in a two-interleaf control system, images are sequentially printed on the front of the first paper sheet, the front of the second paper sheet, the rear of the first paper sheet, the front of the third paper sheet, the rear of the second paper sheet, the rear of the third paper sheet and so on. In a three-interleaf control system, images are sequentially printed on the front of the first paper sheet, the front of the second paper sheet, the front of the third paper sheet, the rear of the first paper sheet, the front of the fourth paper sheet, the rear of the second paper sheet and so on.

Figure 6:
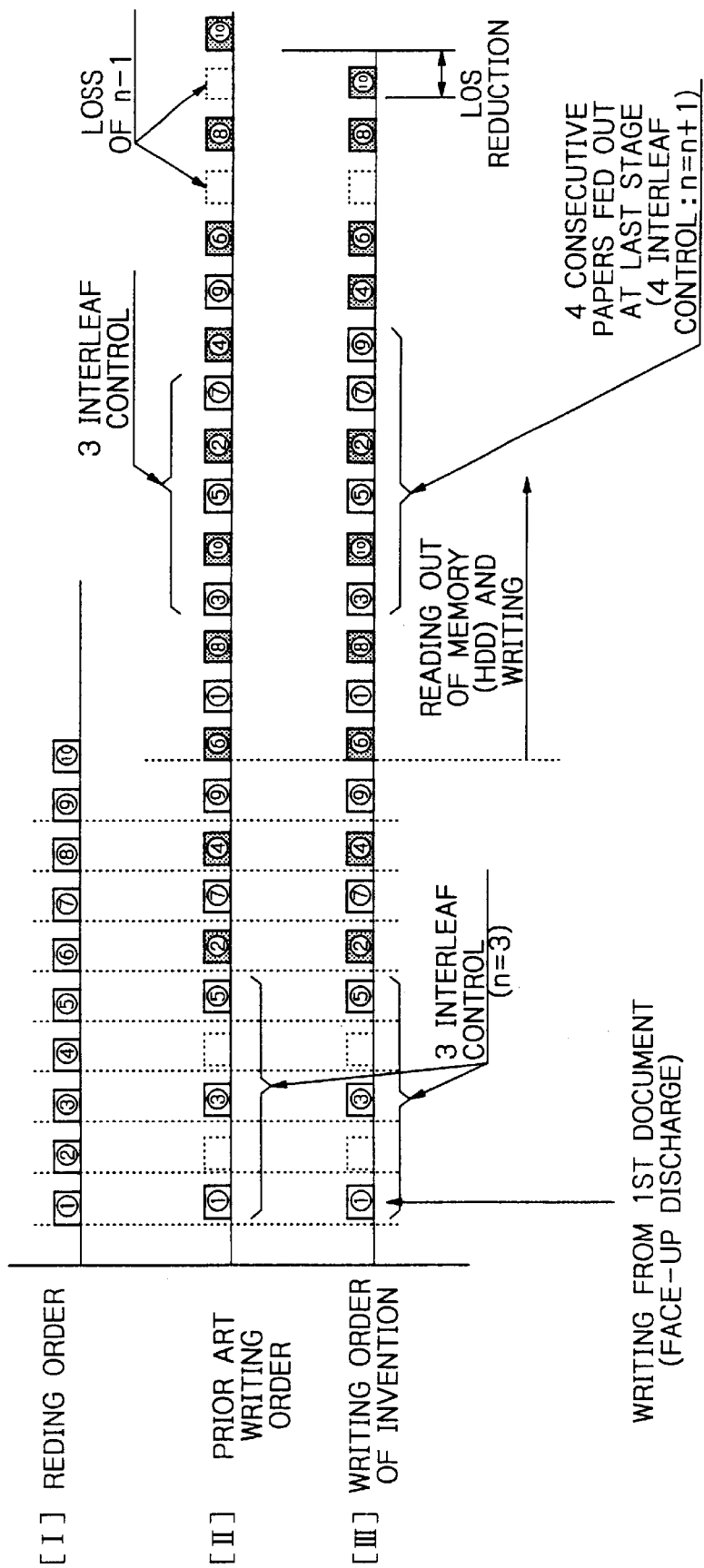
FIG. 6 is a timing chart demonstrating how an ADF reads documents in a three-interleaf control system in which the number of last interleaves is four, and how paper sheets flow via an image forming section.

The interleaf control system will be described more specifically with reference to FIG. 6. FIG. 6 demonstrates the image reading operation of the ADF 300 and the writing operation of the image forming section 100. As shown, assume that two sets of copies of ten one-sided documents are produced by the interleaf control system (sort mode), and that the image reading of the ADF 300 and the image writing can be effected substantially at the same time with respect to odd pages. Image data read by the ADF 300 are sequentially written to the HDD 68 for the sorting purpose. In FIG. 5, the numerals ①, ②, ③, ④ and so on are representative of page numbers.

A conventional printing procedure shown in FIG. 6, [II], sequentially prints images on the front of the first paper sheet (first page), the front of the second paper sheet (third page), the front of the third paper sheet (fifth page), the rear of the first paper sheet (second page), the front of the fourth paper sheet (seventh page) and so on. More specifically, the first paper sheet carrying an image on its front (first page) is reversed and then returned to the image forming section 100 (drum 15) via the duplex conveying unit 111 (duplex loop hereinafter), so that an image is formed on the rear of the paper sheet (second page). Subsequently, the fourth paper to be printed with the seventh page is fed in such a manner as to follow the first page. After the fourth paper sheet, the second paper sheet carrying an image on one side thereof (third page) is fed from the duplex loop. Such a procedure is repeated thereafter.

While the documents are sequentially read, image data are written every time an odd page is read. As a result, at the initial stage of document reading, a loss of n−1 (n being the number of interleaves) occurs at the time when odd pages are read. In the specific case shown in FIG. 6, [II], a loss corresponding to two paper sheets occurs because the number of interleaves is "3". After all the documents have been read, image data are read out of the HDD 68 and transferred to the image memory 66, so that printing is continued without any loss by the Interleaf control. However, at the final stage of printing, a loss of n−1 again occurs because of the absence of new papers to be interleaved, as illustrated. This is the drawback of the interleaf control system and lowers productivity.

The loss at the initial stage of document reading can be obviated if image data are written to the image memory 66 or the HDD 68 by prescanning beforehand and can be read out immediately or if use is made of a system capable of reading both sides of a document at the same time. However, the loss at the final state of printing cannot be obviated.

The illustrative embodiment solves the above-described problem with a procedure shown in FIG. 6, [III]. Even in the procedure of the illustrative embodiment, a loss occurs at the initial stage of document reading in the same manner as in the conventional procedure. If n paper sheets to be form with images on their fronts are continuously fed at the final stage of printing, i.e., if the number of paper sheets to be interleaved is increased to n+1, the loss at the final stage of printing can be reduced by a single paper sheet. However, when only a single set of copies is desired, it may occur that the reading speed of the ADF (copier) 300 is too slow to determine the number of documents. In such a case, the above n+1 interleaf control is, of course, not available at the final stage of printing.

On the other hand, assume that the number of pages is known beforehand on the basis of, e.g., the output of a printer or that all the image data are stored beforehand by prescanning. Then, even when only a single set of copies is desired, it is possible to determine whether or not to execute the n+1 interleaf control on the basis of the number of pages or the amount of image data and therefore to improve productivity more efficiently in accordance with the condition (printer, copier or similar machine). This kind of scheme will be described with reference to FIGS. 7 and 8 hereinafter.

Figure 7:
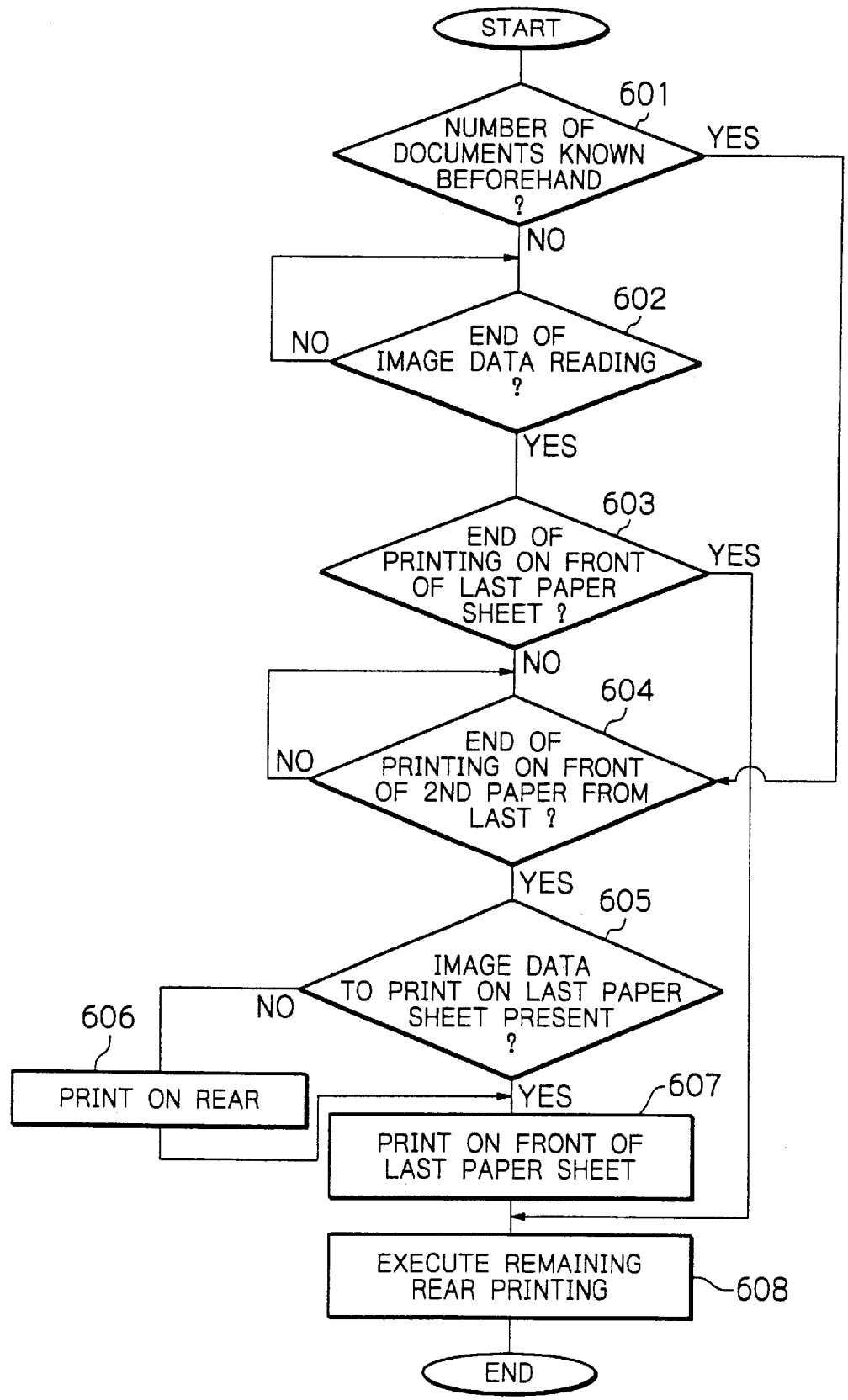
FIG. 7 is a flowchart representative of a specific operation of the illustrative embodiment.

As shown in FIG. 7, whether or not the number of documents is known beforehand is determined (step 601). If the answer of the step 601 is positive (YES), meaning that the number of documents is known on the basis of the printer output or the prescanning (copier), the step 601 is followed by a step 604 for waiting for the end of image formation on the front of the second paper sheet from the last. Just after the image formation on the front of the second paper sheet from the last, whether or not image data to be printed on the last paper sheet exists is determined (step 605). If the answer of the step 605 is YES, an image is printed on the last paper sheet just after the second paper sheet from the last (step 607). Subsequently, images are continuously printed on the rears of the paper sheets refed from the duplex loop (step 608). In this manner, the n+1 interleaf control is executed. The above sequence of steps corresponds to a printer in cases 2 and 3 shown in FIG. 8.

If the answer of the step 605 is negative (NO), i.e., if image data to be printed on the last paper sheet is absent, images are printed on the rears of the paper sheets staying in the duplex loop (step 606). Subsequently, an image is printed on the front of the last paper sheet after image data have been read out of the last document (step 607). This is also followed by the step 608. In this case, the n+1 interleaf control is not executed. Such a sequence of steps corresponds to a printer in case 1, FIG. 8, in which, e.g., the reading of image data is not in time although the number of documents or pages is known beforehand.

If the answer of the step 601 is NO (corresponding mainly to the ADF (copier), the number of documents cannot be determined until all the image data have been read. In this case, after the entire image data have been read (YES, step 602), whether or not an image has been printed on the front of the last paper sheet is determined (step 603). If the answer of the step 603 is YES, images are continuously formed on the rears of the paper sheets present in the duplex loop (step 608). In this case, the n+1 interleaf control is not executed. The above procedure corresponds to a copier (ADF) in the case 1, FIG. 8.

If the answer of the step 603 is NO, whether or not an image has been printed on the front of the second paper sheet from the last (step 604). Because the image data have been fully read in the step 602, it is possible to print an image on the front of the last paper sheet just after the image formation on the front of the second paper sheet from the last. Subsequently, images are continuously formed on the rears of the paper sheets existing in the duplex loop (steps 605 through 607). In this case, the n+1 interleaf control is executed. These steps correspond to the case 2, FIG. 8.

Figure 8:
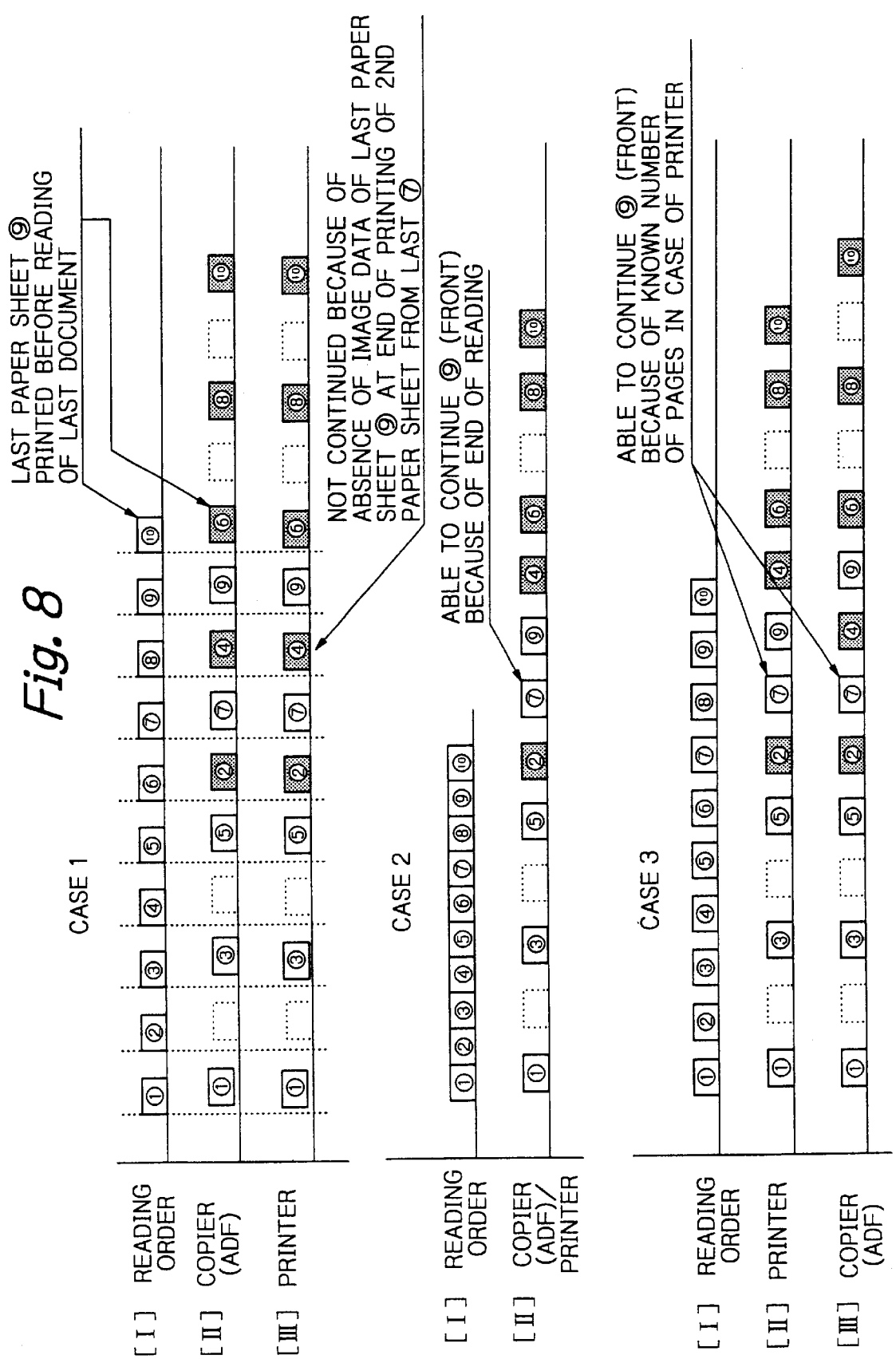
FIG. 8 is a timing chart associated with the flowchart of FIG. 7.

The control procedures shown in FIG. 8 will be described more specifically. FIG. 8 demonstrates a specific case wherein a single set of copies of ten one sided documents are produced. As for the ADF (copier) in the case 1, the number of documents is not known beforehand, but is determined after the last page of the last document has been read. At this instant, the ninth page has already been printed, so that then n+1 interleaf control cannot be executed. This is also true with a printer that knows the number of documents beforehand, because the ninth page is not read at the time when an image has been printed on the seventh page of the second paper sheet from the last.

In the case 2, image data are known at the early stage because of, e.g., prescanning (including a case wherein the reading speed is extremely high). In this case, the n+1 interleaf control can be surely executed.

The case 3 is intermediate between the cases 1 and 2 with respect to timing and occurs when the image reading speed is slightly lower than the image writing or printing speed. In this case, the following difference occurs between the printer knowing the number of documents beforehand and the copier (ADF) not knowing it beforehand. The printer is capable of writing the ninth page just after printing the seventh page of the second paper sheet from the last, so that the n+1 interleaf control can be executed. However, the transition to the n+1 interleaf control cannot be executed because the copier (ADF) does not know the number of documents.

Second Embodiment

Figure 9:
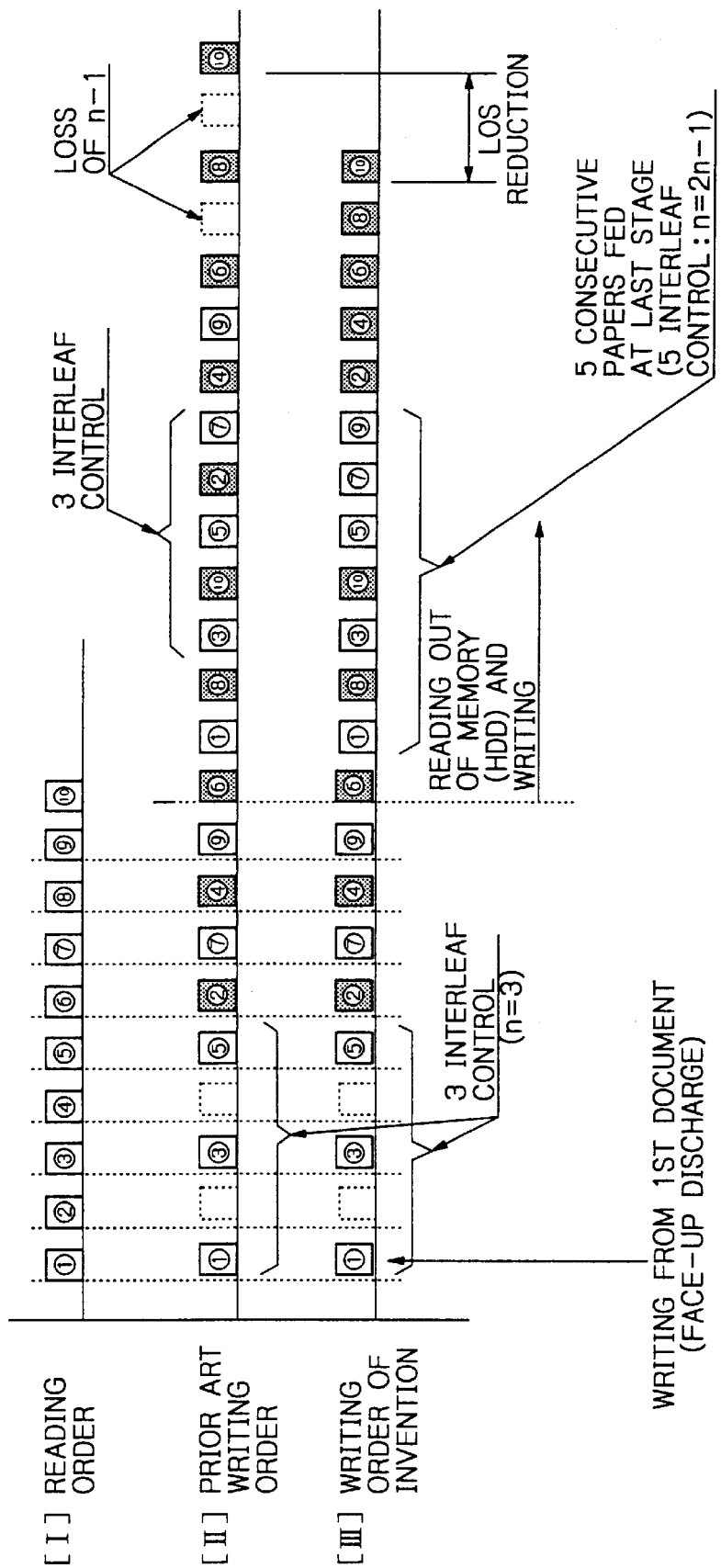
FIG. 9 is a timing chart demonstrating a procedure representative of an alternative embodiment of the present invention.

An alternative embodiment of the present invention will be described with reference to FIG. 9. Briefly, this embodiment not only executes the interleaf control, but also continuously feeds n consecutive paper sheets to be formed with images on their fronts at the final stage of printing. As shown, at the final stage of printing, three paper sheets to be formed with images on their fronts (fifth, seventh and ninth pages) are continuously fed in order to fully obviate the loss stated earlier. In the case of the three-interleave control system, n is "3" while five paper sheets (2n−1) paper sheets stay in the duplex loop and body path at the final stage of printing.

When the number of paper sheets to be interleaved is increased at the final stage of printing, as stated above, it is necessary to provide the conveyance path with a margin for accommodating the paper sheets and to effect such control. In the case of the n+1 interleaf control, only a single interleaf is fed at the final stage of printing (four paper sheets exist in the path in total), as described with reference to FIG. 6. The path has therefore a sufficient margin while the control is simple. By contrast, in the case of the 2n−1 interleaf control, two interleaves are inserted at the final stage (five paper sheets exist in the path in total), as shown in FIG. 9, making the control sophisticated. Although the 2n−1 interleaf control must insert a plurality of extra paper sheets into the path (duplex loop plus body path), it remarkably reduces the loss particular to the final stage.

Specifically, to effect the 2n−1 interleaf control, the intermediate conveying means 118 and duplex outlet conveying means 120, FIG. 2, each are provided with an electromagnetic clutch or similar drive interrupting device. When the number of paper sheets to be interleaved is increased at the final stage, the duplex outlet conveying unit 120 once stops the preceding paper sheet while the intermediate conveying unit 118 stops the following paper sheet at a position close to the preceding paper sheet. This allows the n+1 interleaf control to be smoothly executed at the final stage. For the same purpose, two paper sheets may be brought to a stop at the switchback path 119 one above the other. In addition, such an alternative scheme reduces the length of the duplex path and thereby saves the limited space available in the apparatus body 100. By combining the above two schemes, it is possible to cause four paper sheets to stay in the duplex unit 111 while feeding one paper sheet to the body path. Therefore, five paper sheets in total can sequentially flow at the final stage. That is, in the three-interleaf control system, the maximum number of paper sheets that can flow along the path is five (2n−1).

Assume that the number of paper sheets to be interleaved is increased at the initial stage also. Then, the stop and drive of paper sheets repeatedly occur on the conveyance path. In this sense, increasing the number of inter leaves only once at the last stage is successful to promote reliable conveyance to a significant degree.

Figure 10:
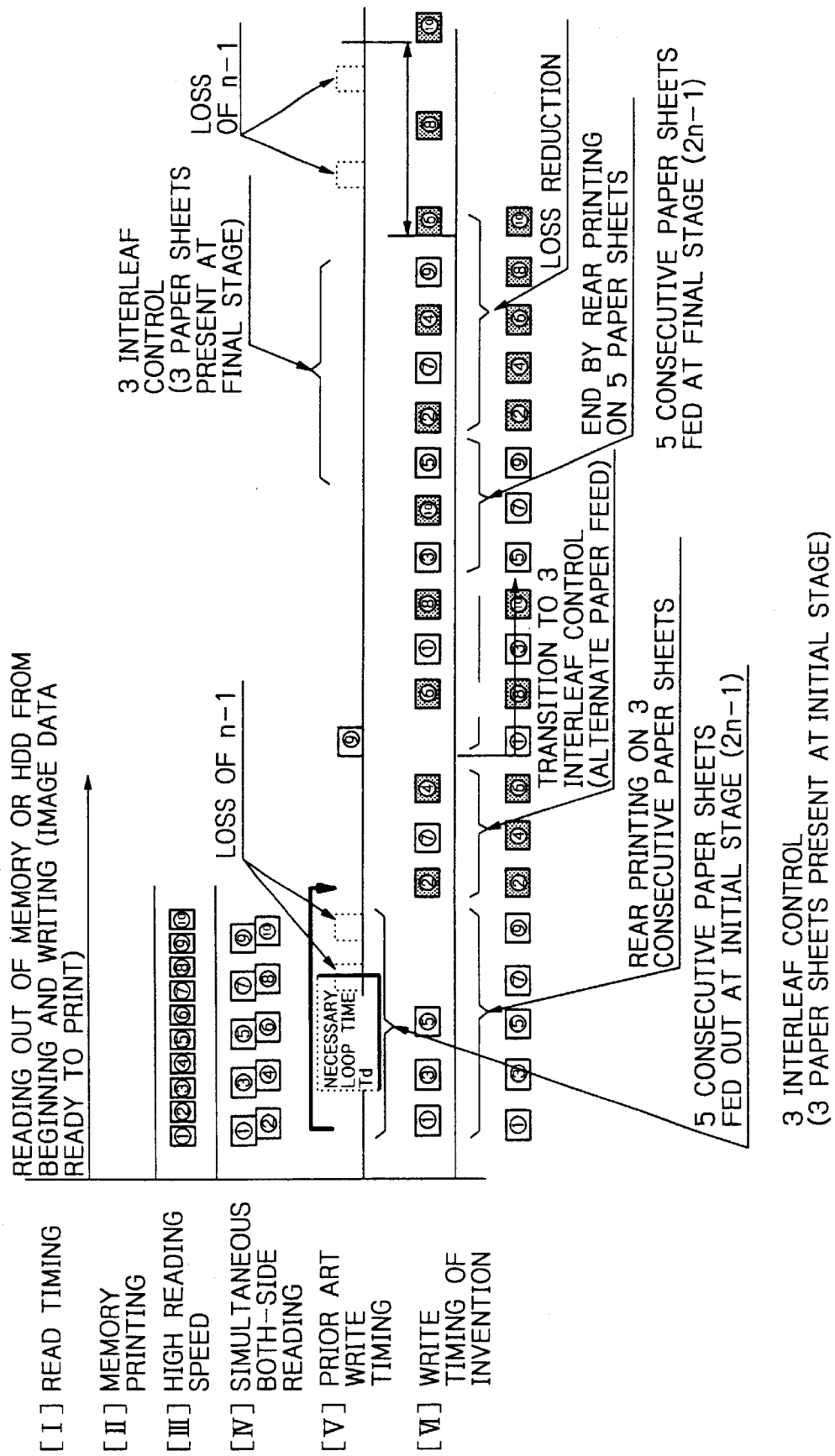
FIG. 10 is a timing chart demonstrating another procedure available with the alternative embodiment.
Figure 11C:
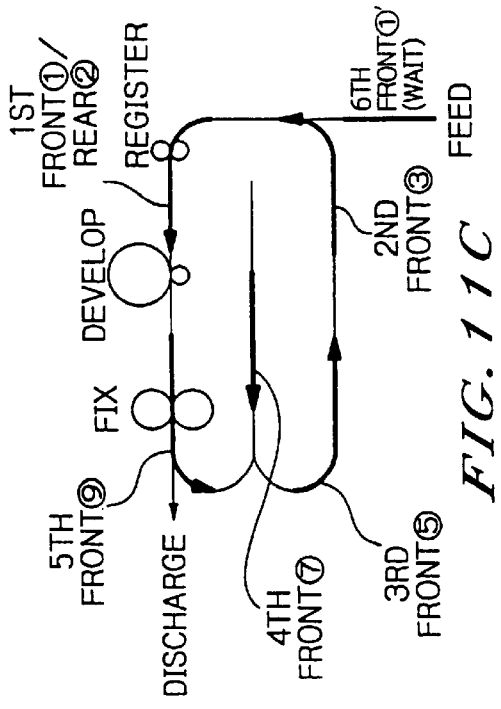
FIGS. 11A through 11H are views showing how paper sheets flow in the alternative embodiment specifically.
Figure 11D:
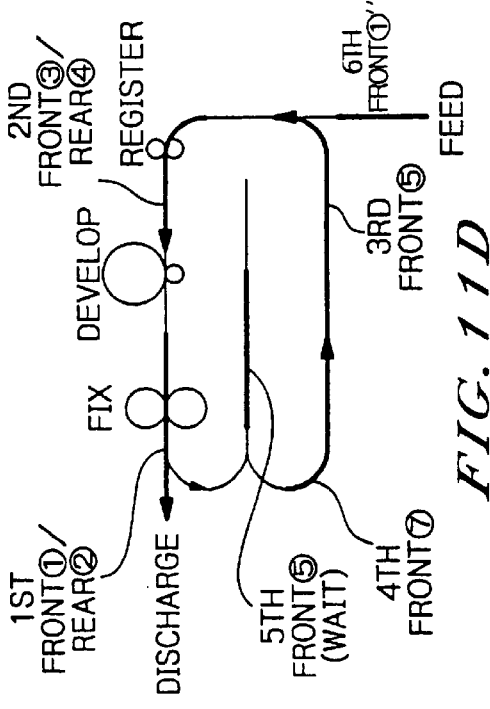
Figure 11A:
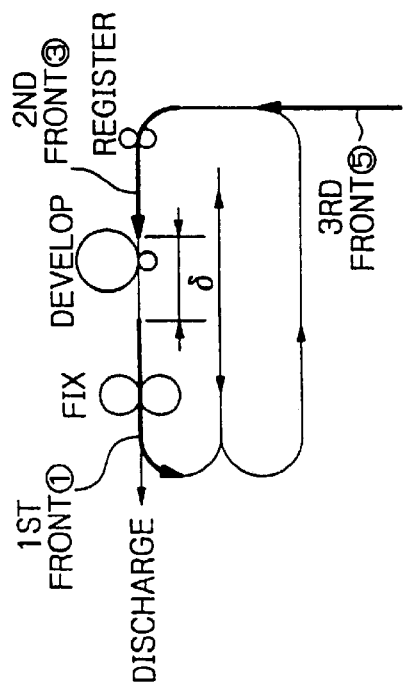
Figure 11B:
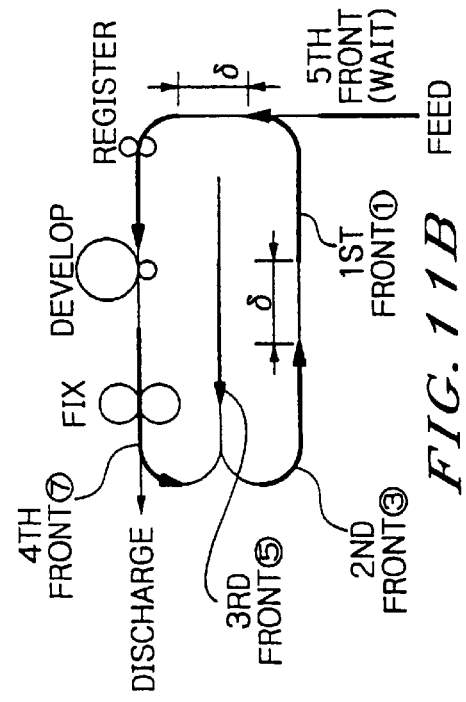
Figure 11E:
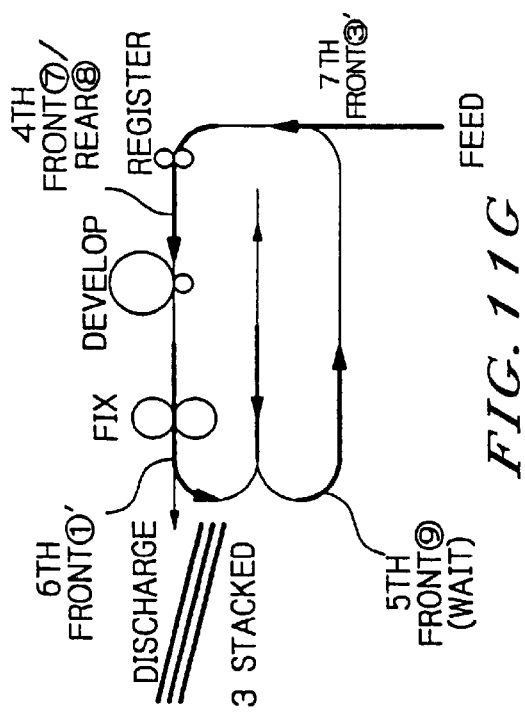
Figure 11F:
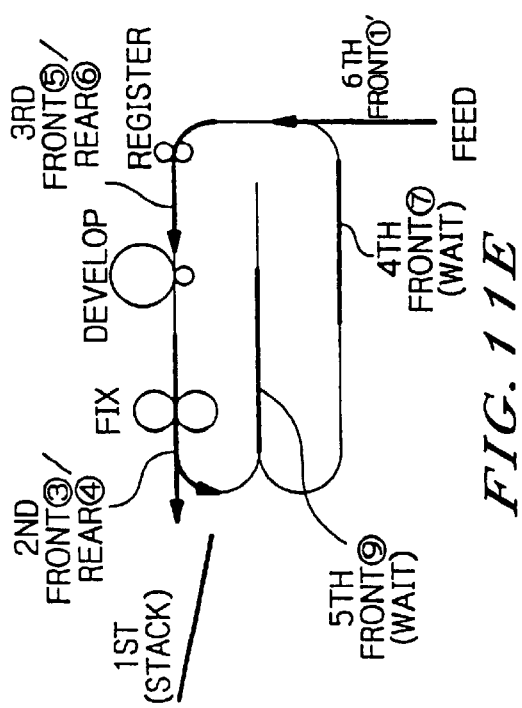
Figure 11G:
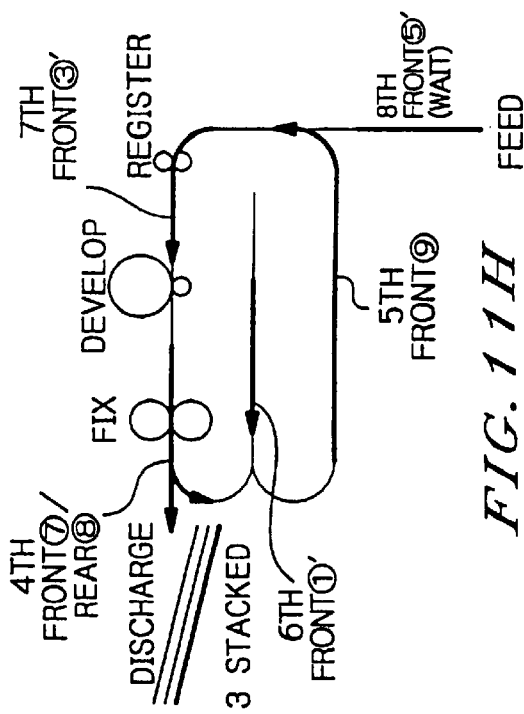
Figure 11H:
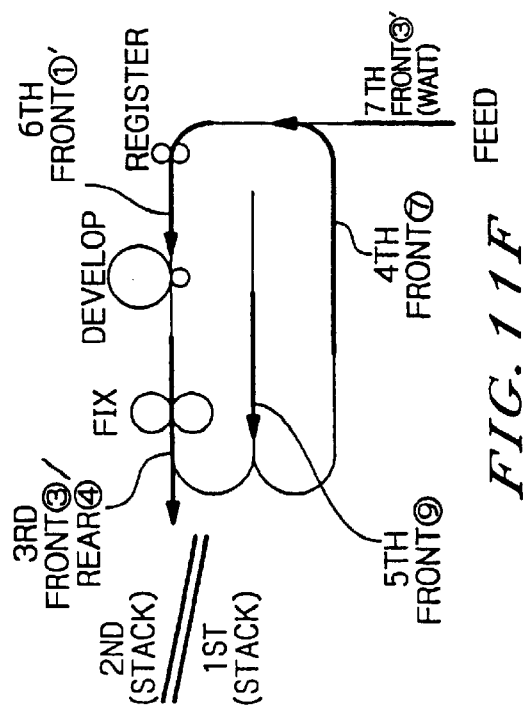

Reference will be made to FIGS. 10, 11A and 11B for describing the characteristic features of the illustrative embodiment more specifically. FIG. 10 shows an interleaf control system applicable to the case wherein the entire image data can be immediately written because of, e.g., prescanning. FIGS. 11A and 11B show the flow of paper sheets implemented by the control system unique to the illustrative embodiment shown in FIG. 10, [VI]. First, reference will be made to FIG. 10 for discussing whether or not the losses at the initial stage and final stage can be obviated if all the image data are ready to be written.

FIG. 10, [II], shows a sequence in which image data are read in the event of memory image recording. In this case, image data are stored in the image memory 66 or the HDD 68 beforehand by prescanning or similar continuous image reading operation and can be read out any time.

FIG. 10, [V], shows a case wherein the conventional interleaf control system implements the earliest write timing at the initial stage. As shown, image data to be printed on the paper sheets ①, ③ and ⑤ are continuously written in the drum 15 at a timing comparable with the image recording timing assigned to a simplex copy mode. In the interleaf control, images are printed on n (=3) paper sheets at the initial stage, and then the alternate paper feed is effected. It follows that a certain period of time Td is necessary for the first paper sheet ① to be returned via the duplex conveyance path for printing an image on the rear thereof. Consequently, even if images are continuously printed on the fronts of the three paper sheets ①, ③ and ⑤, as illustrated, a loss of n−1 occurs before the first paper sheet ① is returned via the duplex conveyance path. it has therefore been difficult to obviate the initial loss ascribable to the length of the duplex conveyance path. This, coupled with the loss of n−1 occurring at the final stage, lowers productivity.

FIG. 10, [III], shows a read timing available with, e.g., an ADF capable of reading image data at a high speed, e.g., a speed more than two times as high as the writing speed. FIG. 10, [IV] shows a read timing at which both sides of each document are read at the same time. These timings prevent the even page reading timing from effecting the sequence of odd page write timing and allows odd pages to be continuously written from the beginning.

However, the read modes shown in FIGS. 10, [III] and [IV], cannot obviate the losses at the initial and final stages so long as they use the conventional control system shown in FIG. 10, [II]. More specifically, none of the reading methods shown in FIGS. 10, [II], [III] and [IV] can obviate the above losses or low productivity ascribable thereto.

It is to be noted that the loss at the final stage can be obviated if the maximum interleaf number at the final stage is 2n−1 as in the procedure shown in FIG. 6 of the first embodiment (identical with FIG. 1, [IV].

FIG. 10, [VI] shows a write timing unique to the illustrative embodiment. In FIG. 10, [VI], two sets of copies of ten one-sided documents are produced (sort mode) by the three-interleaf control system. The illustrative embodiment is practicable when image data to be printed are stored beforehand, i.e., when use is made of any one of the reading methods shown in FIGS. 10, [II] through [IV].

When images are printed on three consecutive paper sheets at the initial stage by the conventional interleaf control shown in FIG. 10, [V], a certain period of time Td is necessary for the first paper sheet (page ①) to be returned via the duplex conveyance, as stated earlier. Therefore, a loss of n−1 also occurs when the first paper sheet is returned to print an image on the rear thereof (page ①). As shown in FIG. 10, [VI], to obviate this loss, images meant for the fronts of 2n–1 paper sheets (pages ①, ③, ⑤, ⑦ and ⑨) are continuously written (and printed) at the initial stage. Subsequently, images meant for the rears of n paper sheets as counted from the first paper sheet (pages ②, ④ and ⑥) begin to be written (and printed) at a time t1. In the illustrative embodiment, because n is "3", images are continuously printed on the fronts of five consecutive paper sheets at first. Subsequently, three of the five one-sided paper sheets are refed from the duplex conveyance path for printing images on the rears thereof. Thereafter, at a time t2, the usual three-interleaf control system is executed to start the alternate paper feed. In this manner, the illustrative embodiment increases the number of paper sheets to be introduced into the duplex conveyance path at the initial stage, then refeeds excessive part of the paper sheets, and then executes the usual interleaf control.

With the above-described procedure, it is possible to surely obviate the loss at the initial stage without regard to the number of interleaves n or the desired number of sets of copies. To obviate the loss at the final stage, the illustrative embodiment continuously prints images on the fronts of 2n–1 paper sheets (five paper sheets in the illustrative embodiment) at the final stage of the interleaf control and then continuously prints images on the rears of the same paper sheets. More specifically, when the second set of copies are produced, images are printed on the fronts of five paper sheets (pages ①, ③, ⑤, ⑦ and ⑨) at the time t2, and then the paper sheets are conveyed to the duplex unit. Subsequently, images are continuously printed on the rears of the above five paper sheets. As a result, as shown in FIG. 10, [V], the loss of n–1 is obviated. This successfully reduces the total printing time and therefore improves productivity.

The prerequisite with the illustrative embodiment is that the entire page-by-page image data are read before the writing operation begins.

Reference will be made to FIGS. 11A and 11B for describing the flow of paper sheets implemented by the control system of the illustrative embodiment shown in FIG. 10, [VI]. Assume that two sets of copies of ten one-sided documents are produced in the sort mode. Then, as shown in FIG. 11A, (a), 2n–1 paper sheets are sequentially fed from the paper feeding section at preselected intervals δ. As a result, as shown in FIG. 11A, (b), the 2n–1 (five) paper sheets exist on the duplex conveyance path together.

Subsequently, as shown in FIGS. 11A, (c), through 11B, (e), the first to third paper sheets sequentially entered the intermediate path 121 are continuously refed toward the recording means so as to be formed with images on their rears (pages ②, ④ and ⑥). At the stage shown in FIG. 11B, (e), the fourth paper sheet (page ①) reached the intermediate path 121 waits at the outlet of the intermediate path 121 until the sixth paper sheet (page ①') is fed from the paper feeding section. It is to be noted that ①' is representative of the first page of the second set of copies. Thereafter, the fourth paper sheet is refed to the recording means. At consecutive stages shown in FIGS. 11B, (f) (time t2, FIG. 10, [VI]) through (h), the usual three-interleaf control or alternate paper feed is executed. In this manner, the illustrative embodiment is capable of effectively obviating the initial loss so long as image data to be written are available beforehand.

Figure 12A:
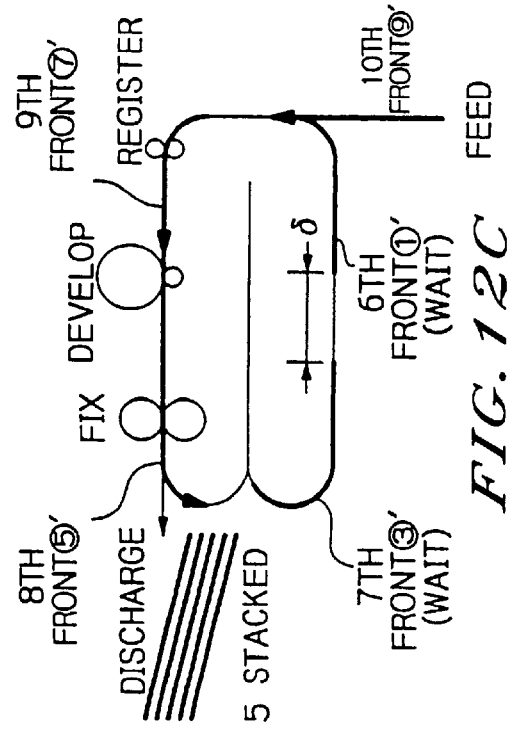
FIGS. 12A through 12H are views showing another specific flow of paper sheets to occur in the alternative embodiment.
Figure 12C:
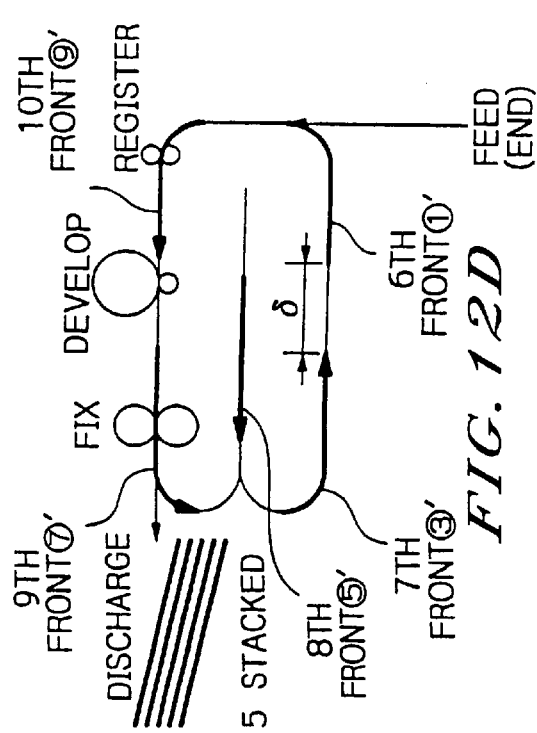
Figure 12B:
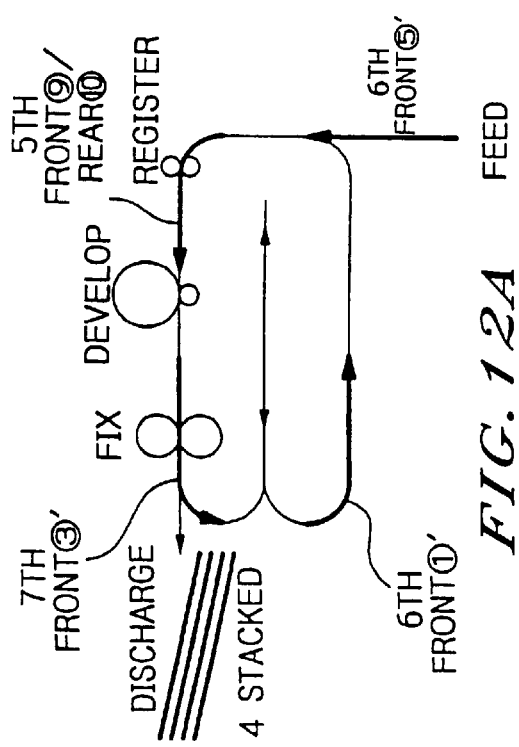
Figure 12D:
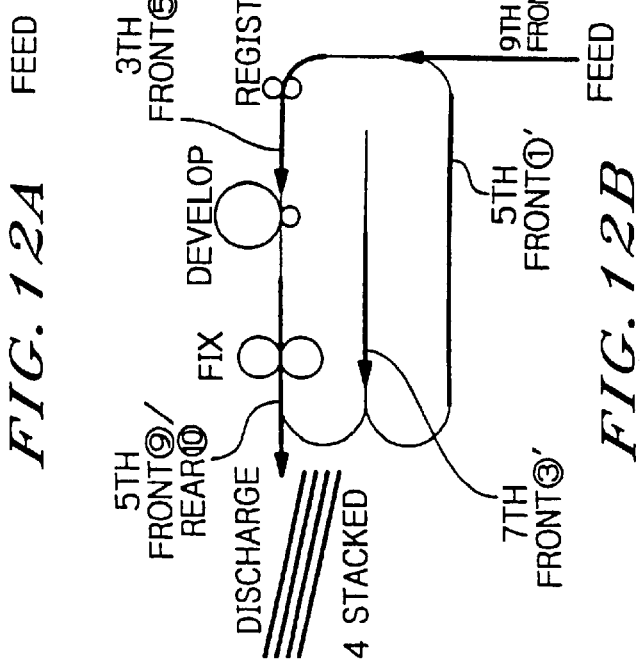
Figure 12E:
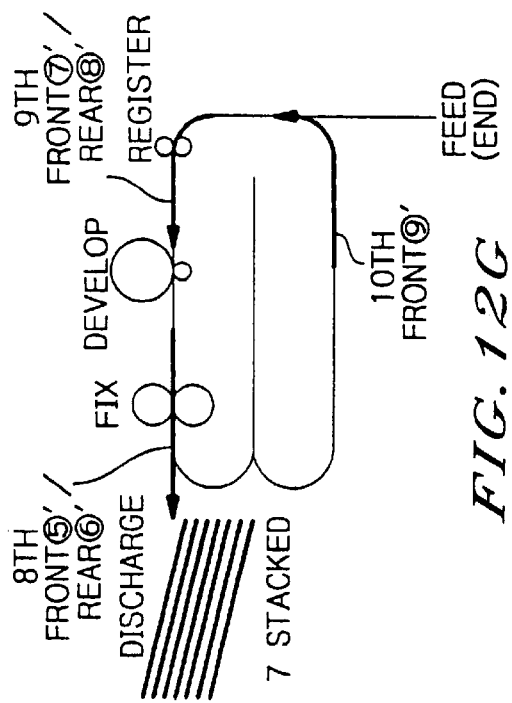
Figure 12F:
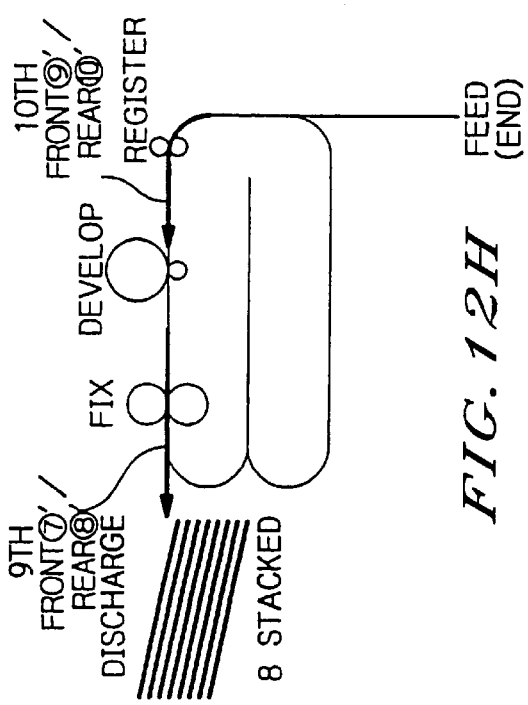
Figure 12G:
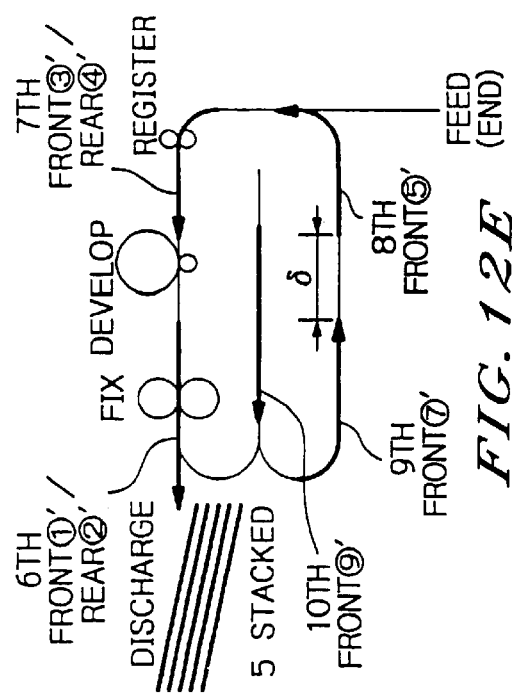
Figure 12H:
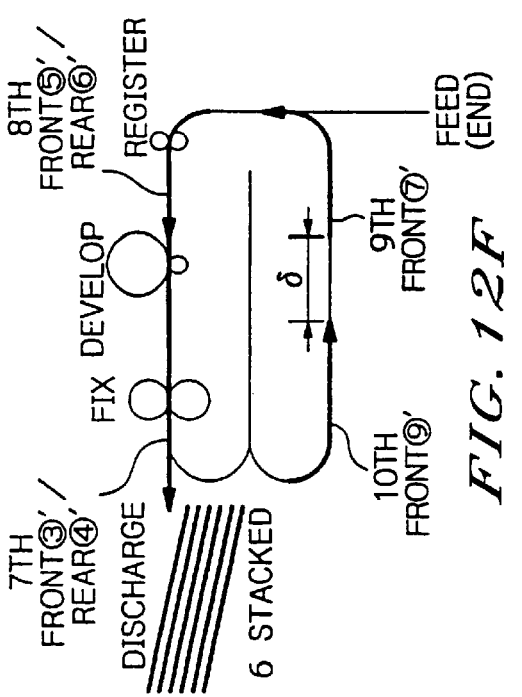

Further, as shown in FIGS. 12A, (i) through (I), images are printed on the fronts of other 2n–1 paper sheets (fifth to tenth papers in the illustrative embodiment) at the final stage. These paper sheets exist on the duplex conveyance path together. Finally, the five paper sheets are continuously refed to be formed with images on the rears thereof (FIGS. 12B, (m) through (p)). This surely obviates the loss at the final stage. More specifically, the alternate paper feed effected in the steps of FIGS. 12A, (i), (j) and (k) causes the sixth and seventh paper sheets to stop on the intermediate path 121. After the tenth paper sheet has been fed from the paper feeding section, the remaining five paper sheets are refed, as shown in FIGS. 12A, (l), through 12B, (p).

The prerequisite with the interleaf control of the illustrative embodiment is that the duplex conveyance path (body path 124, duplex inlet path 113, switchback path 119 and intermediate path 121) can accommodate at least 2n–1 paper sheets at the same time. That is, to obviate the loss at the final stage, the duplex conveyance path must be provided with a length long enough to accommodate 2n–1 paper sheets at the same time.

To obviate the loss at the initial stage with the conventional interleaf control system, it is necessary to, e.g., increase the conveying speed on the duplex conveyance path to a noticeable degree. Increasing the conveying speed, however, not only increases costs in the mechanism and control aspect, but also critically degrades the reliability of conveyance. Further, assume that the length of the conveyance path is reduced to reduce the period of time necessary for the first paper sheet fed form the paper feeding section to the both path 124 to return to the recording position via the intermediate path 121, and that the number of paper sheets to exist on the duplex conveyance path is reduced to n. Then, it is impracticable to introduce 2n–1 paper sheets in the duplex conveyance path for obviating the loss at the final stage. It is therefore essential that to obviate the above loss the duplex conveyance path can accommodate at least 2n–1 paper sheets at the same time, i.e., it has a length great enough to accommodate such paper sheets.

In the illustrative embodiment, at least n–1 paper sheets exist on the path other than the body path 124 (duplex inlet path 113, switchback path 119 and intermediate path 121), so that 2n–1 paper sheets can surely exist on the duplex conveyance path at the final stage. As shown in FIG. 12A, (k), in the illustrative embodiment, two papers (sixth paper ①' and seventh paper ③') stay on the intermediate path 121 in the vicinity of the outlet of the duplex conveying unit 111 at the last stage. When the following three paper sheets (eighth paper sheet ⑤', ninth paper sheet ⑦' and tenth paper sheet ⑨') continuously conveyed at the intervals corresponding to one paper sheet catch up with the paper sheets ①' and ③', 2n–1 paper sheets exist on the duplex conveyance path. At the same time, the refeed of the paper sheets at the last stage begins, as shown in FIG. 12A, (l). The paper sheet stopped in the vicinity of the outlet of the duplex conveying unit 111 has its leading edge gripped by the duplex outlet conveying means or roller pair 120.

Further, the illustrative embodiment allows papers to pass each other on the switchback path 119, so that paper sheets can be continuously fed at the intervals δ from the beginning. Specifically, the switchback path 119 is used to reverse a paper sheet carrying an image on one side thereof. On the switchback path 119, the following paper sheet is reversed while passing the preceding paper sheet having been turned back. At this instant, the preceding paper sheet may be held in a halt or moved when the following paper sheet passes it.

More specifically, after the reversal outlet roller 127 has fully gripped the preceding paper sheet, the reversal inlet roller 125 drives the following paper sheet into the switchback path 119 with the jogger fence 117 being retracted, as stated earlier. If the two consecutive papers cannot pass each other on the switchback path 119, then they must be spaced from each other by an interval corresponding to a single paper sheet. Such an interval makes the continuous feed (continuous image recording), which is the crux of the present invention, impracticable. To reverse two paper sheets without any interference in an apparatus of the type not allowing them to pass each other, it is necessary to increase the conveying distance or to noticeably accelerate the conveyance within a duplex conveying unit. This is undesirable from the reliable conveyance and cost standpoint. In addition, the control becomes sophisticated.

In summary, it will be seen that the present invention provides a duplex image recording method and an apparatus therefor having various unprecedented advantages, as enumerated below.

(1) Assume that images are continuously printed on the first sides of n recording media at the beginning. Then, at the final stage of printing, interleaf control is effected to print images on the first sides of n+1 recording media. It is therefore possible to reduce a loss to occur at the final stage due to the interleaf control, thereby enhancing productivity in a duplex record mode.

(2) Whether or not to effect the interleaf control with n+1 recording media at the last stage of printing is determined after an image has been printed on the first side of the second recording medium from the last. Therefore, even when a single set or copy of printings is desired in a copier or a printer executing a particular method of processing image data read, optimal processing can be effected in accordance with the kind of the copier or that of the printer so as to improve productivity.

(3) Assuming that images are continuously printed on the first sides of n recording media at the beginning, then the interleaf control is executed with the maximum 2n−1 consecutive recording media at the final stage of printing. This fully obviates the loss particular to the processing of the last recording medium.

(4) Whether or not image data to be printed on the first side of the last recording medium is present is determined. Assume that the number of documents or that of pages is known beforehand. Then, after an image as been printed on the first side of the second recording medium from the last, whether or not image data to be printed on the first side of the last recording medium is present is determined in order to determine whether or not to feed the n+1 recording media at the final stage of printing. Therefore, even when a single copy of printings is desired in a copier or a printer executing a particular method of processing image data read, optimal processing (reduction of the loss as the final stage) can be effected in accordance with the kind of the copier or that of the printer so as to improve productivity.

(5) Whether or not image data to be printed on the first side of the last recording medium is present is determined. Assume that the number of documents or that of pages is not known beforehand. Then, after the last image data has been read, whether or not images have been printed on the first side of the last recording medium and the first side of the second recording medium from the last are sequentially determined. Whether or not to feed the n+1 recording media at the final stage of printing is determined on the basis of the result of the above decision. Therefore, even when a single copy of printings is desired in a copier or a printer executing a particular method of processing image data read, optimal processing (reduction of the loss as the final stage) can be effected in accordance with the kind of the copier or that of the printer so as to improve productivity.

(6) A recording medium turned back by reversing means is again conveyed to recording means by way of an intermediate path. A duplex conveyance path, including the intermediate path, via which the recording medium is conveyed in the duplex record mode has a length great enough to accommodate at least 2n−1 recording media. At the initial stage preceding the interleaf control, images are continuously recorded on the first sides of the maximum 2n−1 recording media. Subsequently, images are continuously printed on the second sides of the maximum n recording media. This is followed by the interleaf control. Consequently, if image data to be printed are stored in a memory or similar storage beforehand, a loss to occur at the initial stage due to the interleaf control is obviated. It follows that performance available in the duplex record mode is comparable with performance available in a simplex record mode. That is, a recording time in the duplex copy mode is equal to a recording time in the simplex record mode, realizing 100% productivity of duplex printings.

(7) The duplex conveyance path includes a body path, a duplex inlet path and a switchback path in addition to the intermediate path. Such paths, forming a loop, obviate the need for an extra path for the interleaf control and implements the above-described performance.

(8) At the final stage of recording, the maximum 2n−1 recording media each carrying an image on the first side thereof are again introduced into the duplex conveyance path. Such paper sheets are continuously refed in order to form images on the second sides thereof. This successfully obviates the loss to occur as the last stage due to the interleaf control and therefore implements the same performance in both of the simplex mode and duplex mode.

(9) At least n−1 recording media exist together on the duplex conveyance path other than the body path, i.e., the duplex inlet path, switchback path and intermediate path. Such recording media can therefore surely exist in the duplex conveyance path. This is because the loss at the final stage cannot be obviated unless at least 2n−1 recording media exist on the above path together.

(10) Two consecutive recording media can pass each other on the switchback path. This allows a number of paper sheets to be continuously introduced into the duplex conveyance path without increasing the length of the path or accelerating the conveyance on the path. Consequently, the advantage (6) is achievable at a low cost without increasing the overall size of the apparatus, while insuring reliable conveyance.

(11) Means for allowing two recording media to pass each other is implemented by the switchback path, which switches back a one-sided recording medium, and returning means for conveying the recording medium out of the switchback path. The advantage (10) is therefore achievable with a simple configuration.

Various modifications will become possible for those skilled in the art after receiving the teachings of the present disclosure without departing from the scope thereof.

What is claimed is:

1. In a method of recording, among image data stored in an order of page, two consecutive pages of image data on a first and a second side of a recording medium, respectively, by interleaf control that records image data alternately on said second side of said recording medium carrying an image on said first side and a new recording medium, assuming that the image data are continuously recorded on first sides of n consecutive recording media at the beginning, said interleaf control continuously prints the image data on first sides of n+1 consecutive recording media at a final stage of printing.

2. A method as claimed in claim 1, wherein whether or not to execute the interleaf control with the n+1 consecutive recording media at the final stage of printing is determined after the image data has been recorded on the first side of a second recording medium from the last.

3. In a method of recording, among image data stored in an order of page, two consecutive pages of image data on a first and a second side of a recording medium, respectively, by interleaf control that records image data alternately on said second side of said recording medium carrying an image on said first side and a new recording medium, assuming that the image data are continuously recorded on first sides of n consecutive recording media at the beginning, said interleaf control continuously prints the image data on first sides of maximum 2n−1 consecutive recording media at a final stage of printing.

4. A duplex image recording apparatus for recording images on a first and a second side of a recording medium by interleaf control that records images alternately on said second side of said recording medium carrying an image on said first side and a new recording medium, said duplex image recording apparatus comprising:

storing means for storing image data in an order of page;

recording means for recording, among the image data stored in said storing means, two consecutive pages of image data on a first and a second side of a recording medium, respectively;

reversing means for reversing, after the image data has been recorded on the first side of the recording medium, said recording medium;

conveying means for again conveying the recording medium reversed by said reversing means toward said recording means to thereby allow the image data to be recorded on the second side of said recording medium; and control means for controlling said storing means, said recording means, said reversing means, and said conveying means;

said control means causing, assuming that the image data are continuously printed on first sides of n consecutive recording media at the beginning, the image data to be printed on first sides of n+1 consecutive recording media at a final stage of printing.

5. An apparatus as claimed in claim 4, wherein said control means determines whether or not image data to be recorded on the first side of a last recording medium is present, determines, if a number of documents or a number of pages is known beforehand and after the image data has been recorded on the first side of a second recording medium from the last, whether or not image data to be printed on the first side of a last recording medium following said last recording medium is present so as to determine whether or not to record the image data on the n+1 consecutive recording media at the final stage of printing.

6. An apparatus as claimed in claim 4, wherein said control means determines whether or not image data to be recorded on the first side of a last recording medium is present, sequentially determines, if a number of documents or a number of pages is not known beforehand and after last image data has been read, whether or not the image data have been recorded on the first side of a last recording medium and a first side of a second recording medium from the last so as to determine whether or not to record the image data on the n+1 consecutive recording media at the final stage of printing.

7. A duplex image recording apparatus for recording images on a first and a second side of a recording medium by interleaf control that records images alternately on said second side of said recording medium carrying an image on said first side and a new recording medium, said duplex image recording apparatus comprising:

storing means for storing image data in an order of page;

recording means for recording, among the image data stored in said storing means, two pages of image data on a first and a second side of a recording medium, respectively;

reversing means for reversing, after the image data has been recorded on the first side of the recording medium, said recording medium;

conveying means for again conveying the recording medium reversed by said reversing means toward said recording means to thereby allow the image data to be recorded on the second side of said recording medium; and control means for controlling said storing means, said recording means, said reversing means, and said conveying means;

said control means causing, assuming that the image data are continuously printed on first sides of n consecutive recording media at the beginning, the image data to be printed on first sides of maximum 2n−1 consecutive recording media at a final stage of printing.

8. An apparatus as claimed in claim 7, further comprising an intermediate path for again guiding the recording medium reversed by said reversing means to said recording means, wherein a duplex conveyance path, including said intermediate path, via which the recording medium is conveyed in a duplex record mode has a length great enough to accommodate at least 2n−1 recording media, and wherein said control means causes the image data to be continuously recorded on first sides of maximum 2n−1 consecutive recording media at an initial stage preceding the interleaf control, and executes said interleaf control after causing the image data to be continuously recorded on second sides of maximum n recording media.

9. An apparatus as claimed in claim 8, wherein said duplex conveyance path comprises a loop consisting of a body path, a duplex inlet path, a switchback path, and said intermediate path.

10. An apparatus as claimed in claim 8, wherein said control means causes the image data to be continuously recorded on first sides of maximum 2n−1 consecutive recording media at a final stage of recording and then causes the image data to be continuously recorded on second sides of said 2n−1 consecutive recording media at the end of printing.

11. An apparatus as claimed in claim 8, wherein said duplex conveyance path, except for said body path located upstream of said intermediate path, has a length great enough to accommodate at least n−1 recording media at the same time.

12. An apparatus as claimed in claim 11, further comprising:

a switchback path positioned upstream of said intermediate path for reversing the recording medium carrying an image on the first side thereof; and means arranged in said switchback path for reversing a following recording medium following a preceding recording medium having been reversed, by causing said following recording medium to pass said preceding recording medium.

13. An apparatus as claimed in claim 12, wherein said means for reversing the following recording means comprises:
a switchback path for switching back the recording medium carrying an image on the first side thereof; and
returning means for conveying the recording medium out of said switchback path;
said means causing said conveying means to retract from said switchback path while causing said returning means to grip the preceding recording medium, and then driving the following recording medium into said switchback path, whereby two paper sheets are allowed to exist on said switchback path at the same time.

14. An apparatus as claimed in claim 8, further comprising:
a switchback path positioned upstream of said intermediate path for reversing the recording medium carrying an image on the first side thereof; and
means arranged in said switchback path for reversing a following recording medium following a preceding recording medium having been reversed, by causing said following recording medium to pass said preceding recording medium.

15. An apparatus as claimed in claim 14, wherein said means for reversing the following recording medium comprises:
a switchback path for switching back the recording medium carrying an image on the first side thereof; and
returning means for conveying the recording medium out of said switchback path;
said means causing said conveying means to retract from said switchback path while causing said returning means to grip the preceding recording medium, and then driving the following recording medium into said switchback path, whereby two paper sheets are allowed to exist on said switchback path at the same time.

16. An apparatus as claimed in claim 7, wherein said control means causes the image data to be continuously recorded on first sides of maximum 2n−1 consecutive recording media at a final stage of recording and then causes the image data to be continuously recorded on second sides of said 2n−1 consecutive recording media at the end of printing.

17. A duplex image recording apparatus for recording images on a first and a second side of a recording medium by interleaf control that records images alternately on said second side of said recording medium carrying an image on said first side and a new recording medium, said duplex image recording apparatus comprising:
a storage configured to store image data in an order of page;
a recording device configured to record, among the image data stored in said storing means, two consecutive pages of image data on a first and a second side of a recording medium, respectively;
a reversing device configured to reverse, after the image data has been recorded on the first side of the recording medium, said recording medium;
a conveying device configured to again convey the recording medium reversed by said reversing device toward said recording device to thereby allow the image data to be recorded on the second side of said recording medium; and
a controller configured to control said storage, said recording device, said reversing device, and said conveying device;
said controller causing, assuming that the image data are continuously printed on first sides of n consecutive recording media at the beginning, the image data to be printed on first sides of n+1 consecutive recording media at a final stage of printing.

18. An apparatus as claimed in claim 17, wherein said controller determines whether or not image data to be recorded on the first side of a last recording medium is present, determines, if a number of documents or a number of pages is known beforehand and after the image data has been recorded on the first side of a second recording medium from the last, whether or note image data to be printed on the first side of a last recording medium following said last recording medium is present so as to determine whether or not to record the image data on n+1 consecutive recording media at the final stage of printing.

19. An apparatus as claimed in claim 17, wherein said controller determines whether or not image data to be recorded on the first side of a last recording medium is present, sequentially determines, if a number of documents or a number of pages is not known beforehand and after last image data has been read, whether or not the image data have been recorded on the first side of a last recording medium and a first side of a second recording medium from the last so as to determine whether or not to record the image data on n+1 consecutive recording media at the final stage of printing.

20. A duplex image recording apparatus for recording images on a first and a second side of a recording medium by interleaf control that records images alternately on said second side of said recording medium carrying an image on said first side and a new recording medium, said duplex image recording apparatus comprising:
a storage configured to store image data in an order of page;
a recording device configured to record, among the image data stored in said storage, two pages of image data on a first and a second side of a recording medium, respectively;
a reversing device configured to reverse, after the image data has been recorded on the first side of the recording medium, said recording medium;
a conveying device configured to again convey the recording medium reversed by said reversing device toward said recording device to thereby allow the image data to be recorded on the second side of said recording medium; and
a controller configured to control said storage, said recording device, said reversing device, and said conveying device;
said controller causing, assuming that the image data are continuously printed on first sides of n consecutive recording media at the beginning, the image data to be printed on first sides of maximum 2n−1 consecutive recording media at a final stage of printing.

21. An apparatus as claimed in claim 20, further comprising an intermediate path for again guiding the recording medium reversed by said reversing device to said recording device, wherein a duplex conveyance path, including said intermediate path, via which the recording medium is conveyed in a duplex record mode has a length great enough to accommodate at least 2n−1 recording media, and wherein said controller causes the image data to be continuously recorded on first sides of maximum 2n−1 consecutive recording medium at an initial stage preceding the interleaf control, and executes said interleaf control after causing the image data to be continuously recorded on second sides of maximum n recording media.

22. An apparatus as claimed in claim 21, wherein said duplex conveyance path comprises a loop consisting of a body path, a duplex inlet path, a switchback path, and said intermediate path.

23. An apparatus as claimed in claim 21, wherein said controller causes the image data to be continuously recorded on first sides of maximum 2n−1 consecutive recording media at a final stage of recording and then causes the image data to be continuously recorded on second sides of said 2n−1 consecutive recording media at the end of printing.

24. An apparatus as claimed in claim 21, wherein said duplex conveyance path, except for said body path located upstream of said intermediate path, has a length great enough to accommodate at least n−1 recording media at the same time.

25. An apparatus as claimed in claim 24, further comprising:
   a switchback path positioned upstream of said intermediate path for reversing the recording medium carrying an image on the first side thereof; and
   a device arranged in said switchback path for reversing a following recording medium following a preceding recording medium having been reversed, by causing said following recording medium to pass said preceding recording medium.

26. An apparatus as claimed in claim 25, wherein said device for reversing the following recording means comprises:
   a switchback path for switching back the recording medium carrying an image on the first side thereof; and
   a returning device for conveying the recording medium out of said switchback path;
   said device causing said conveying device to retract from said switchback path while causing said returning device to grip the preceding recording medium, and then driving the following recording medium into said switchback path, whereby two paper sheets are allowed to exist on said switchback path at the same time.

27. An apparatus as claimed in claim 21, further comprising:
   a switchback path positioned upstream of said intermediate path for reversing the recording medium carrying an image on the first side thereof; and
   a device arranged in said switchback path for reversing a following recording medium following a preceding recording medium having been reversed, by causing said following recording medium to pass said preceding recording medium.

28. An apparatus as claimed in claim 27, wherein said device for reversing the following recording medium comprises:
   a switchback path for switching back the recording medium carrying an image on the first side thereof; and
   a returning device for conveying the recording medium out of said switchback path;
   said device causing said conveying device to retract from said switchback path while causing said returning device to grip the preceding recording medium, and then driving the following recording medium into said switchback path, whereby two paper sheets are allowed to exist on said switchback path at the same time.

29. An apparatus as claimed in claim 20, wherein said controller causes the image data to be continuously recorded on first sides of maximum 2n−1 consecutive recording media at a final stage of recording and then causes the image data to be continuously recorded on second sides of said 2n−1 consecutive recording media at the end of printing.

* * * * *

UNITED STATES PATENT AND TRADEMARK OFFICE
CERTIFICATE OF CORRECTION

PATENT NO.    : 6,393,252 B1
DATED         : May 21, 2002
INVENTOR(S)   : Yamagishi It is certified that error appears in the above-identified patent and that said Letters Patent is hereby corrected as shown below:

<u>Title page,</u>
Item [30], Foreign Application Data should read as follows:
-- [30]        Foreign Application Priority Data
    Oct. 25, 1999    (JP) ------------------------ 11-303056
    Mar. 10, 2000    (JP) ------------------------ 2000-067559
    Oct. 10, 2000    (JP) ------------------------ 2000-309717 --

Signed and Sealed this

Fifteenth Day of October, 2002

*Attest:*

*Attesting Officer*

JAMES E. ROGAN
*Director of the United States Patent and Trademark Office*